United States Patent
Kristani

(10) Patent No.: US 9,494,075 B2
(45) Date of Patent: Nov. 15, 2016

(54) FOUR-CYCLE INTERNAL COMBUSTION ENGINE WITH PRE-STAGE COOLED COMPRESSION

(71) Applicant: Filip Kristani, Maywood, NJ (US)

(72) Inventor: Filip Kristani, Maywood, NJ (US)

(*) Notice: Subject to any disclaimer, the term of this patent is extended or adjusted under 35 U.S.C. 154(b) by 289 days.

(21) Appl. No.: 14/279,580

(22) Filed: May 16, 2014

(65) Prior Publication Data

US 2015/0252718 A1 Sep. 10, 2015

Related U.S. Application Data

(63) Continuation-in-part of application No. 14/200,202, filed on Mar. 7, 2014, now abandoned.

(51) Int. Cl.

| F02B 29/04 | (2006.01) |
|---|---|
| F02B 33/06 | (2006.01) |
| F02B 33/22 | (2006.01) |
| F02B 33/44 | (2006.01) |
| F02B 37/00 | (2006.01) |
| F02B 41/06 | (2006.01) |
| F02B 41/10 | (2006.01) |

(52) U.S. Cl.
CPC ........... *F02B 29/0493* (2013.01); *F02B 33/06* (2013.01); *F02B 33/22* (2013.01); *F02B 33/44* (2013.01); *F02B 37/00* (2013.01); *F02B 41/06* (2013.01); *F02B 41/10* (2013.01); *Y02T 10/14* (2013.01); *Y02T 10/144* (2013.01); *Y02T 10/146* (2013.01); *Y02T 10/163* (2013.01)

(58) Field of Classification Search
CPC .... F02B 29/0493; F02B 33/06; F02B 33/22; F02B 33/44; F02B 37/00; F02B 41/06; F02B 41/10
See application file for complete search history.

(56) References Cited

U.S. PATENT DOCUMENTS

| 3,765,180 | A | 10/1973 | Brown | |
|---|---|---|---|---|
| 4,169,434 | A | 10/1979 | Guenther | |
| 4,671,226 | A | 6/1987 | van Rinsum | |
| 4,962,645 | A | 10/1990 | Morgan | |
| 5,072,589 | A * | 12/1991 | Schmitz | F02B 41/08 123/560 |
| 5,086,746 | A | 2/1992 | Albertson | |
| 5,103,645 | A * | 4/1992 | Haring | F02B 1/12 123/500 |
| 5,150,692 | A | 9/1992 | Trombley et al. | |
| 7,007,639 | B1 * | 3/2006 | Luttgeharm | F01L 5/14 123/190.1 |
| 2010/0163214 | A1 * | 7/2010 | Ouradnik | F02B 29/0412 165/104.28 |

* cited by examiner

*Primary Examiner* — Jacob Amick
(74) *Attorney, Agent, or Firm* — Thomas J. Germinario

(57) ABSTRACT

A four-cycle internal combustion engine has a single or multi-stage pre-cooled compression, which allows the temperature and pressure of intake air to the combustion cylinders to be tightly controlled, so that a much higher compression ratio and pre-ignition compression pressure can be achieved without approaching the air/fuel mixture auto-ignition threshold. The minimal threshold pressure of air intake is determined to be >1.8 Bars at sea level and a minimal temperature drop of at least 50° C. at the heat exchanger air cooling radiator. Because this design can effectively regulate and set the maximum pre-ignition temperature of the fuel-air mixture, it can combust virtually any type of liquid hydrocarbon fuel without knocking. This four-cycle engine, due to its higher compression ratio, generates power equivalent to or greater than a standard four-cycle engine in a smaller and lighter engine and at a higher efficiency.

10 Claims, 21 Drawing Sheets

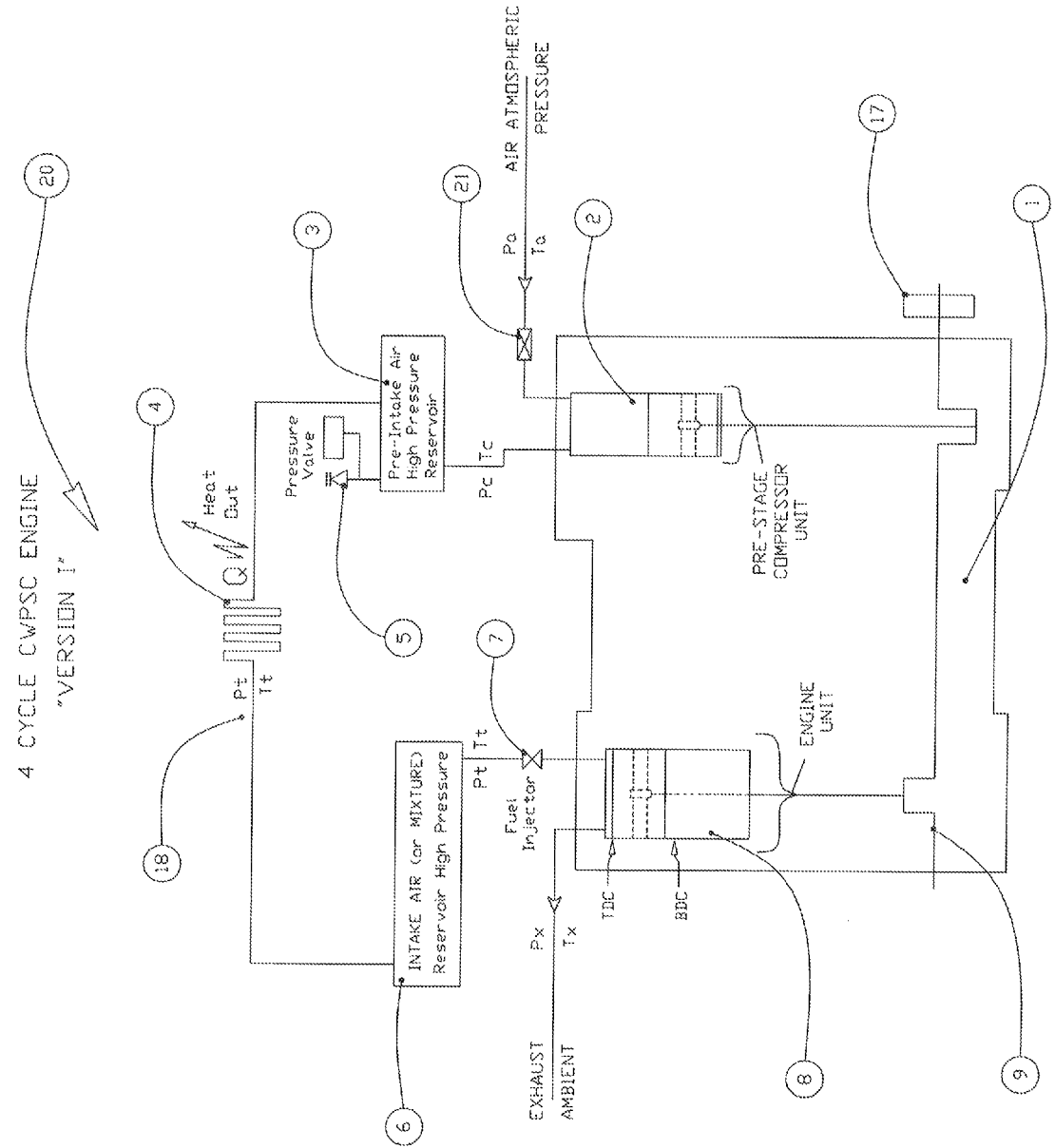

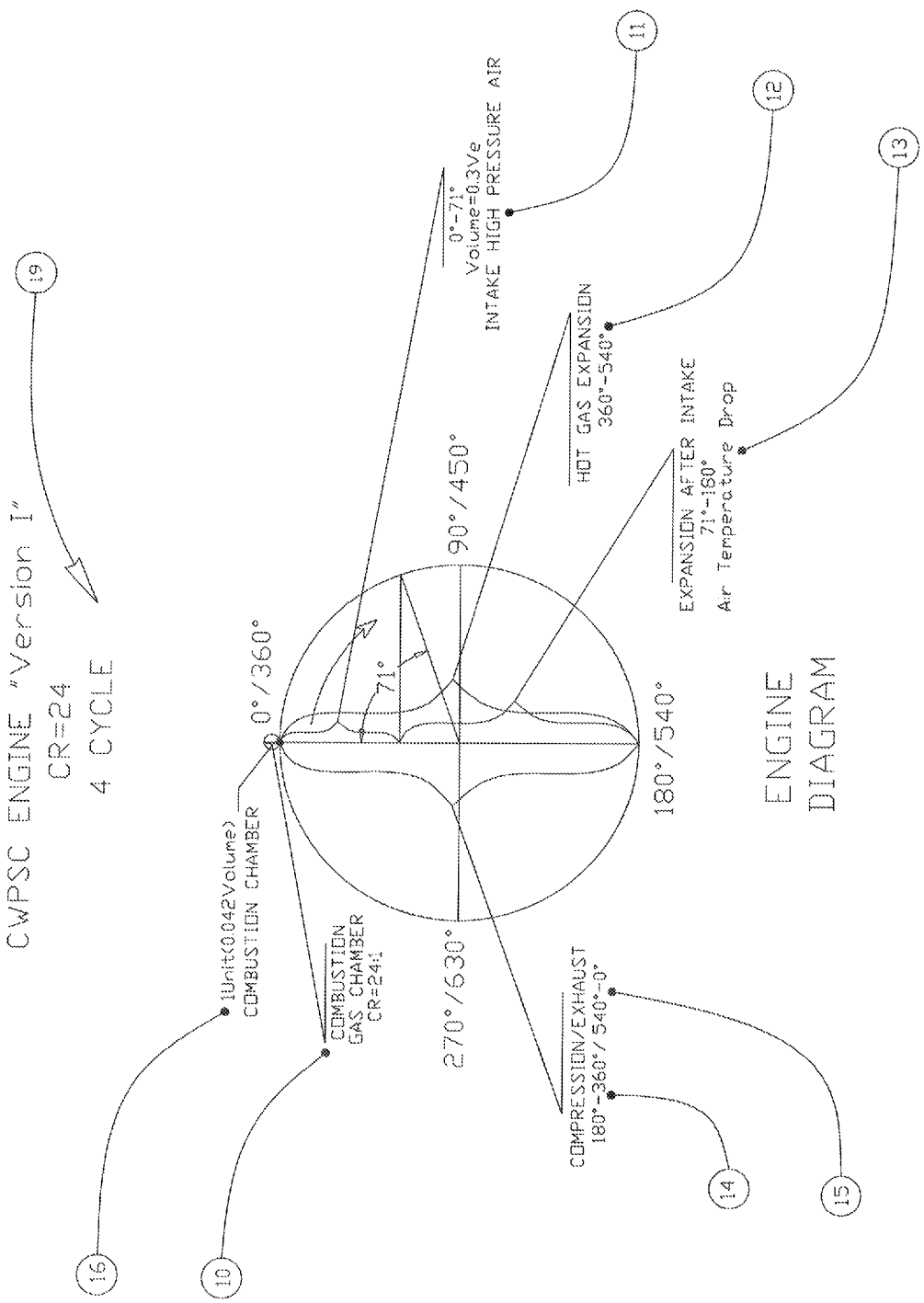
FIGURE # 2

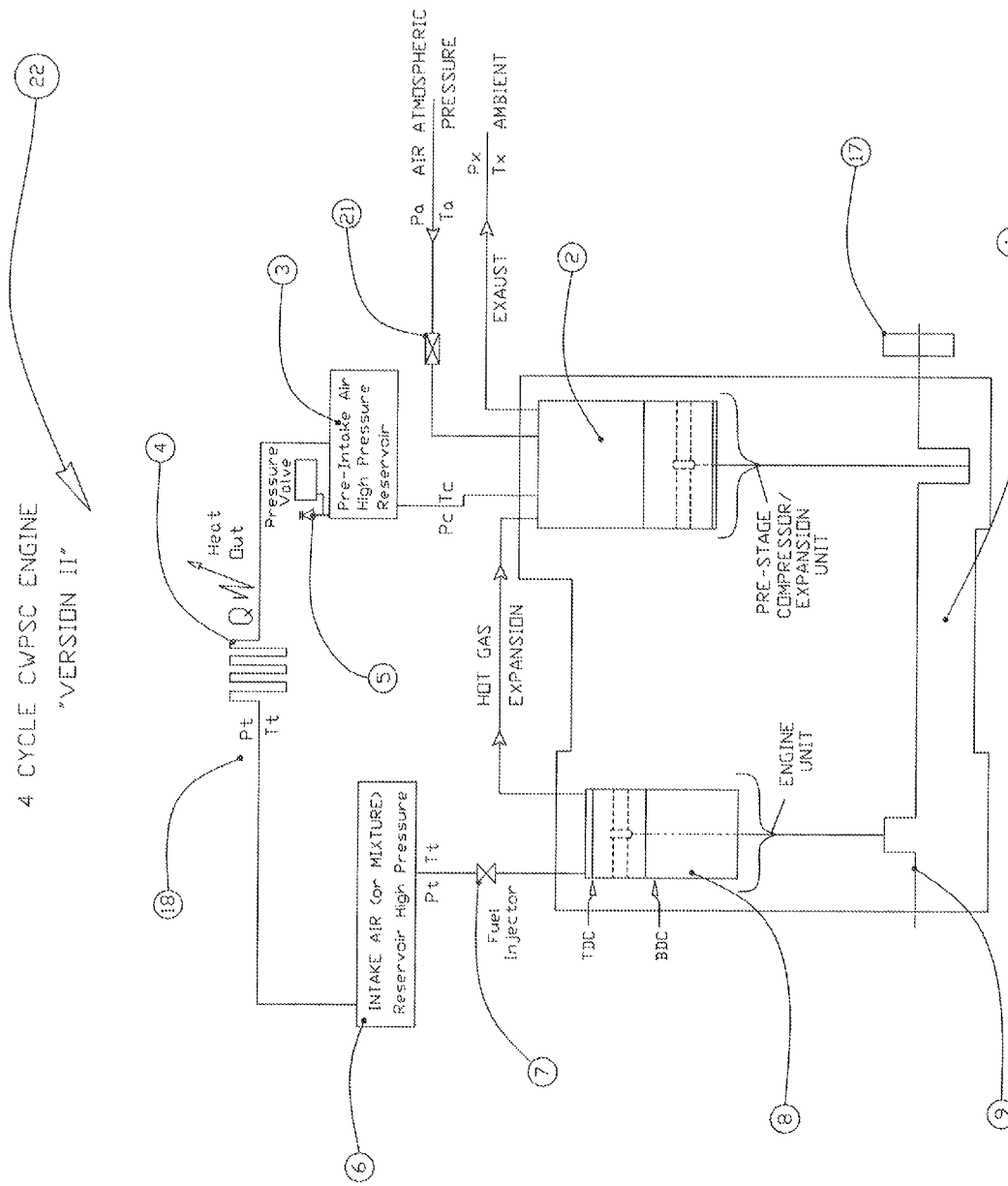

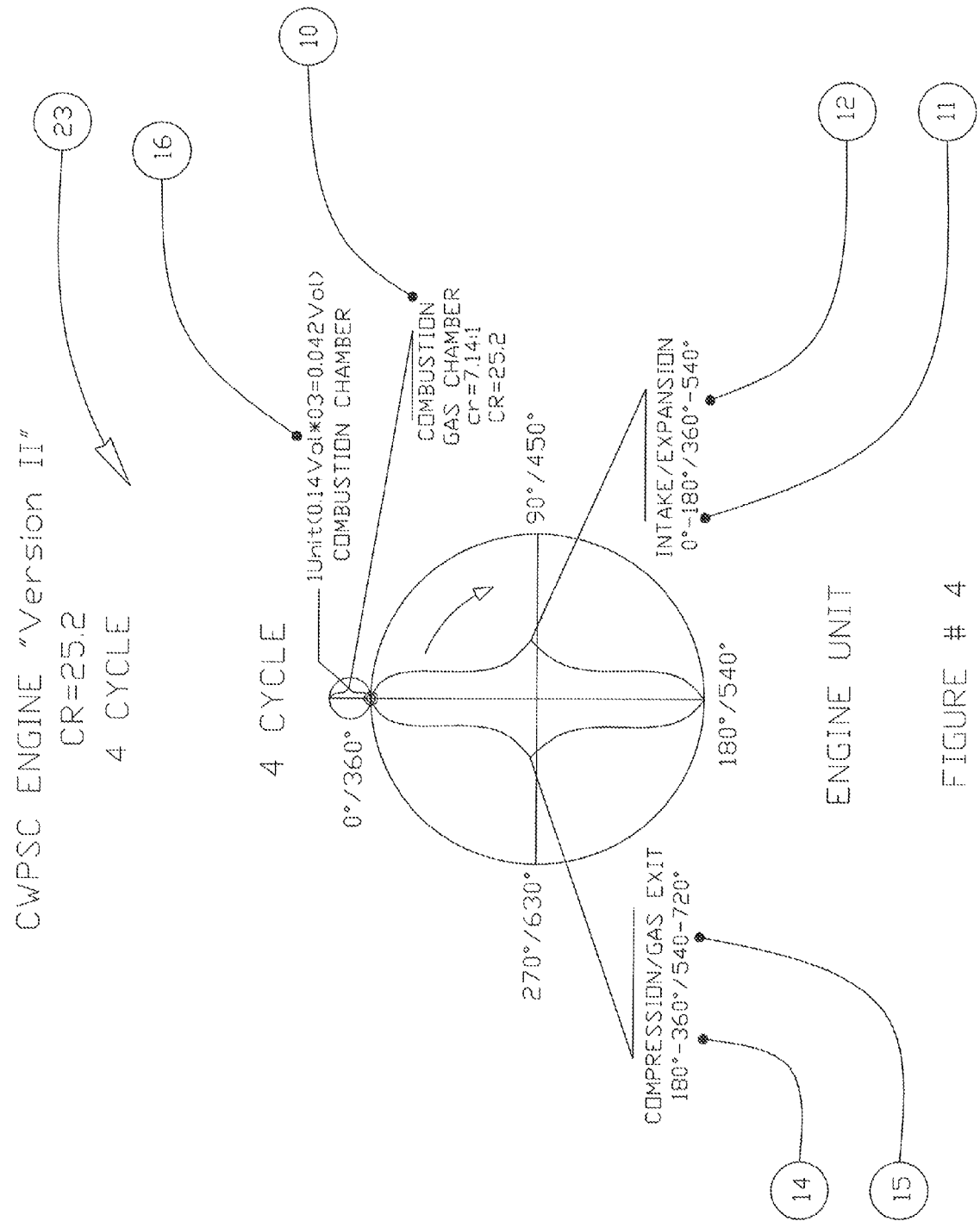

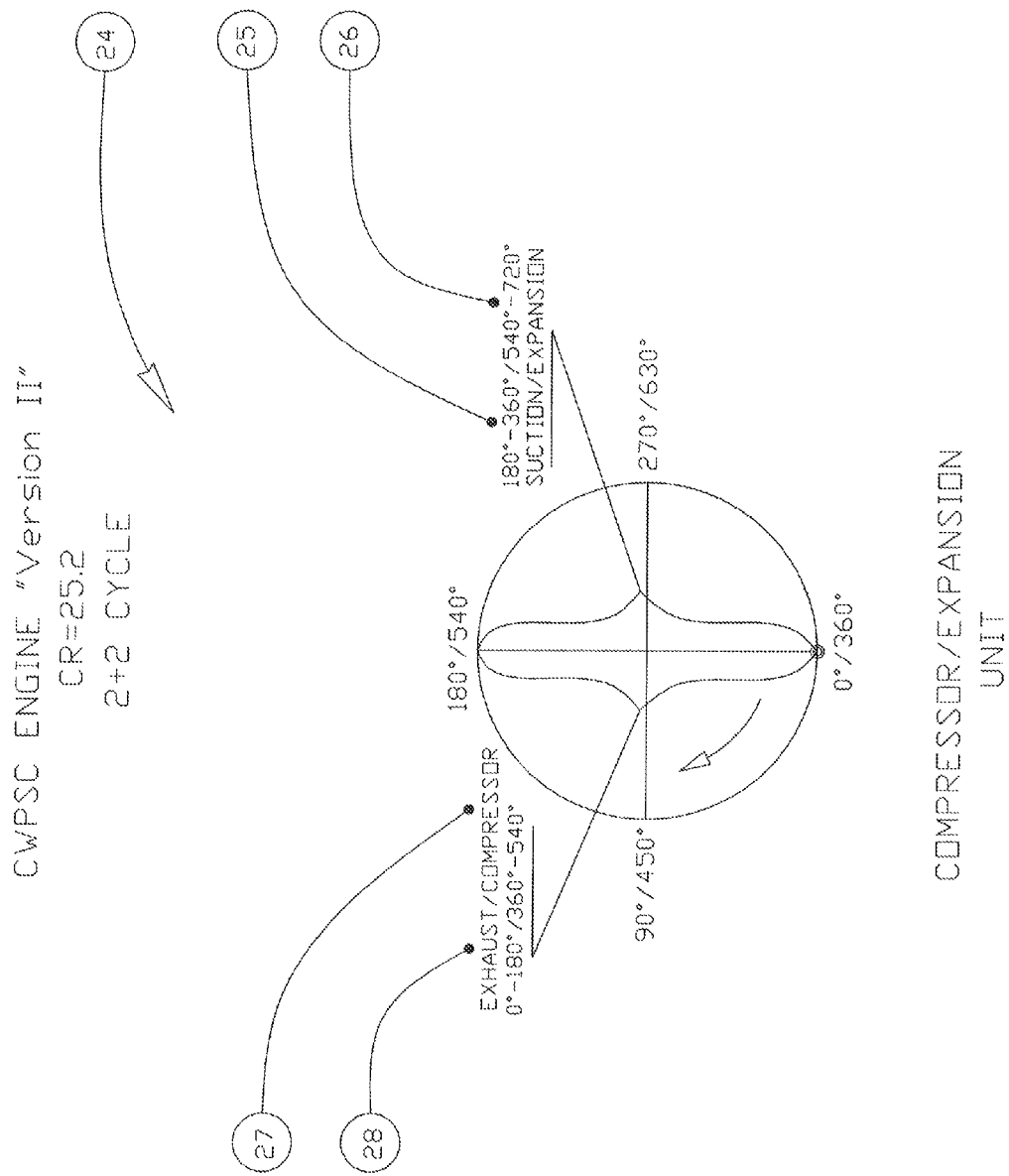

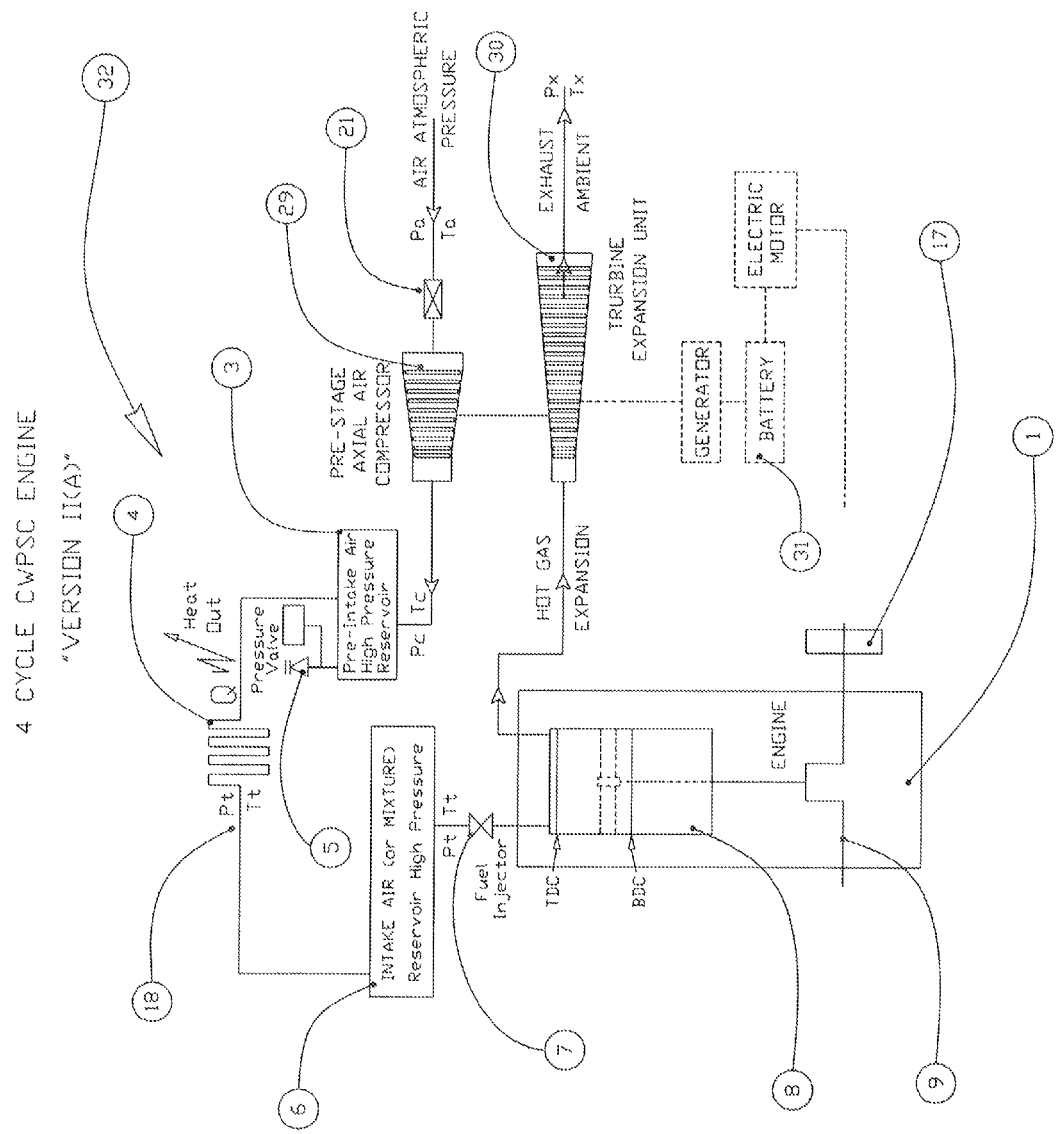
FIGURE # 6

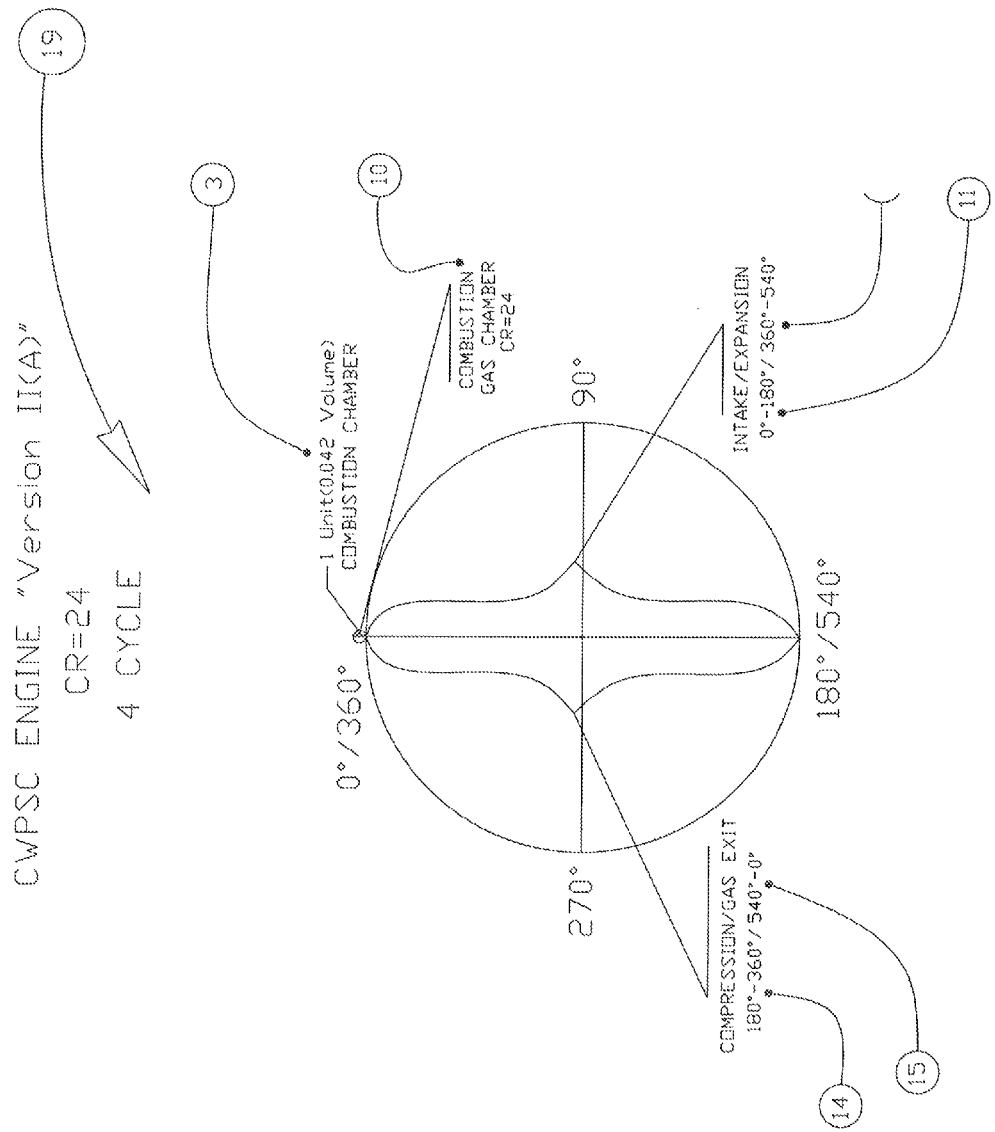

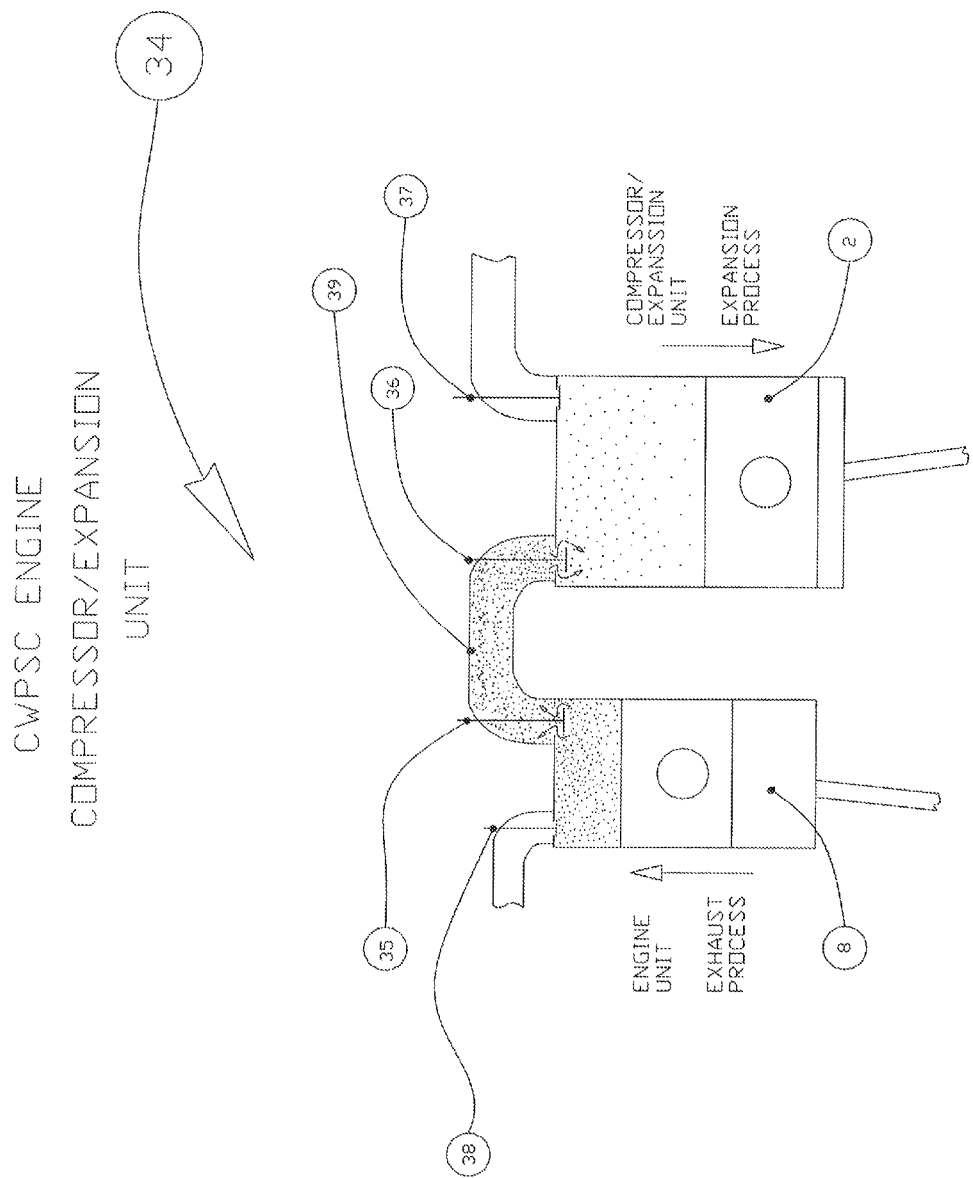

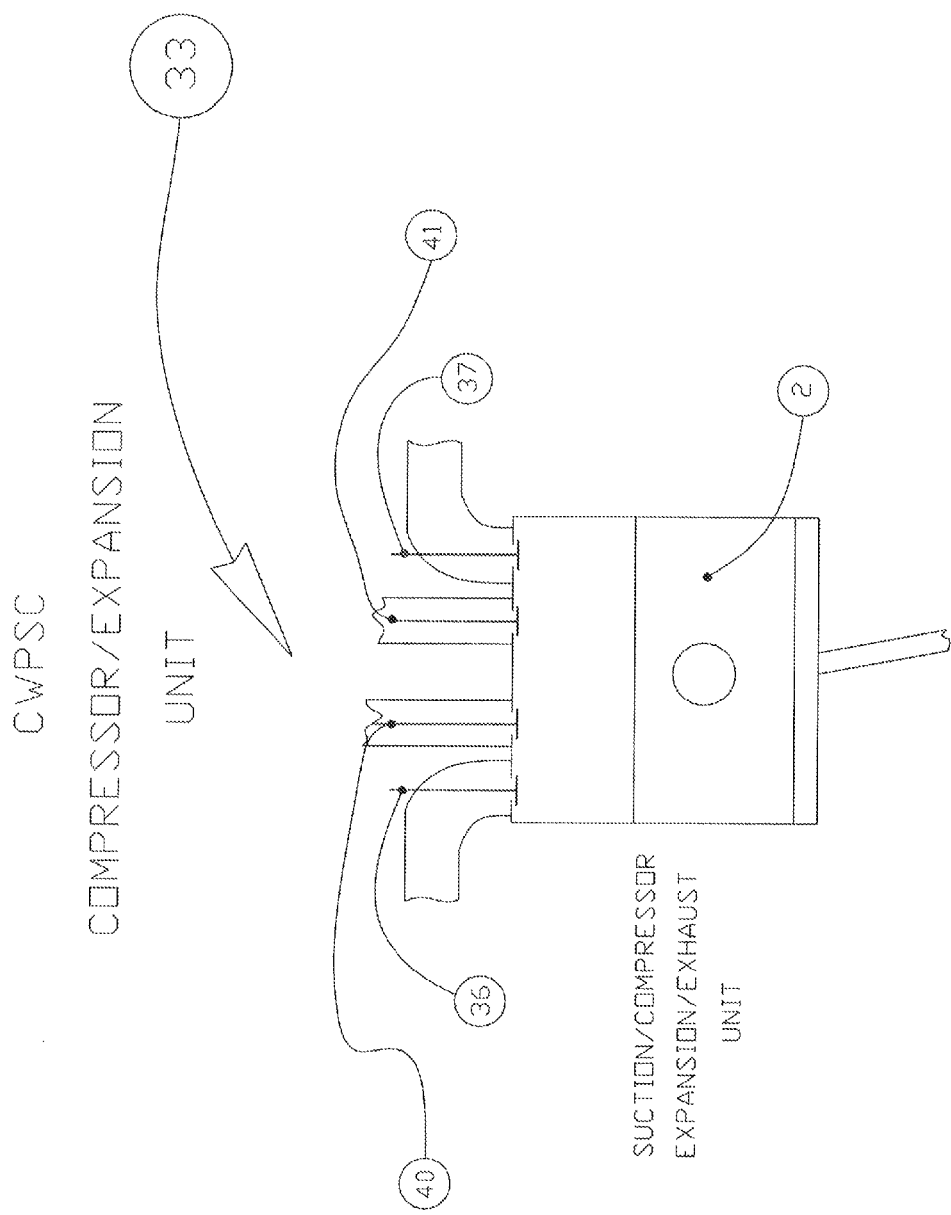
FIGURE # 9

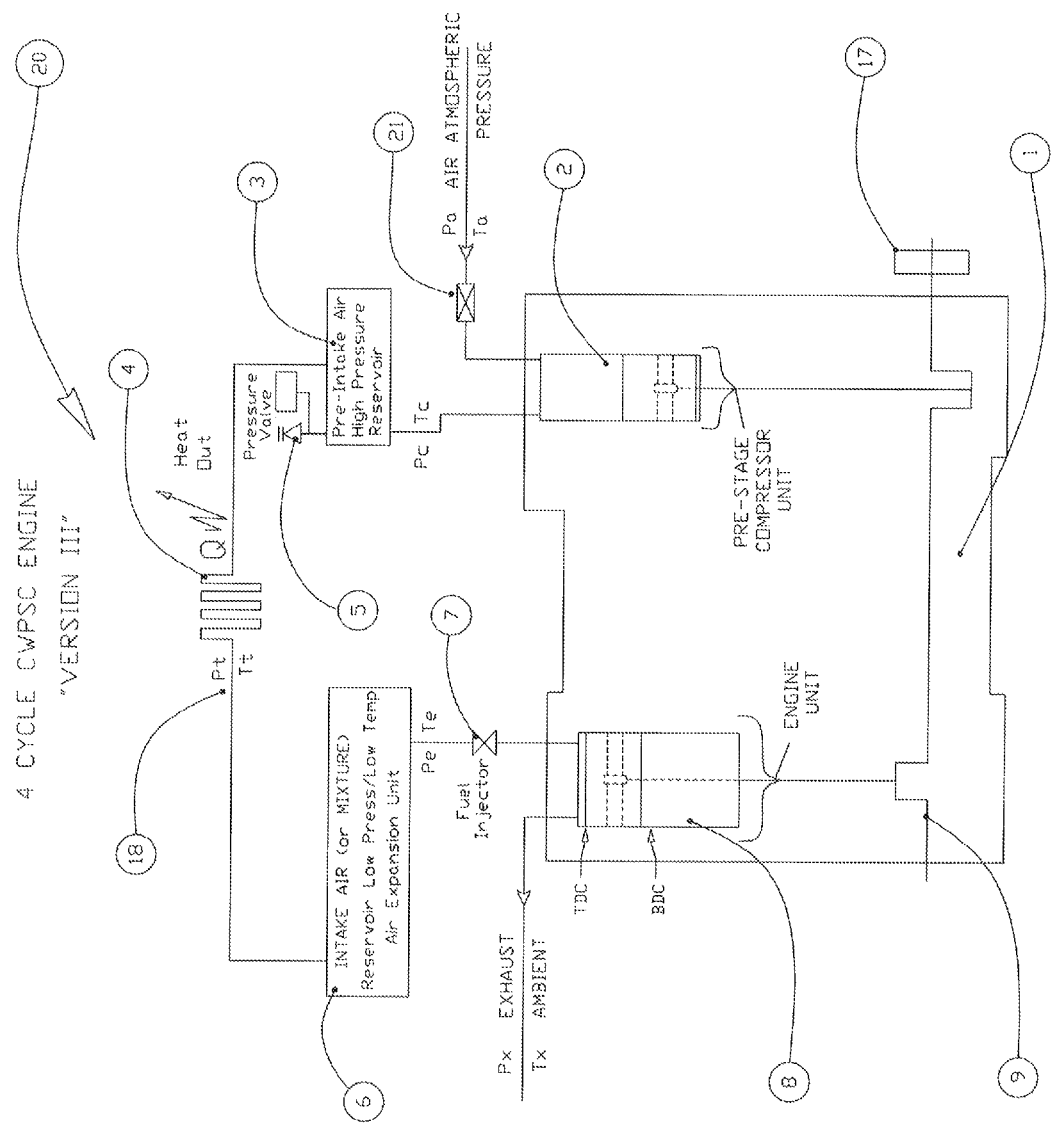

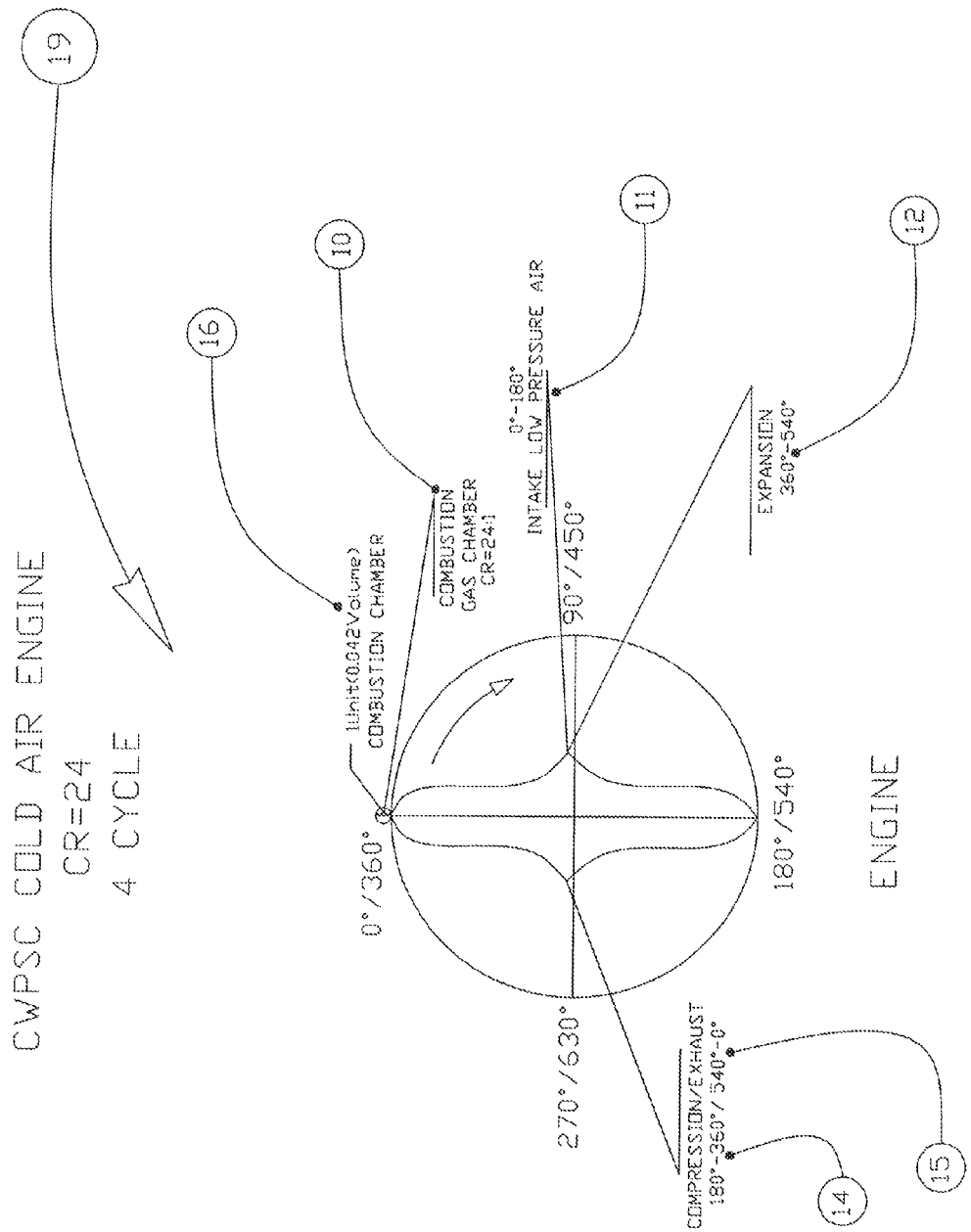

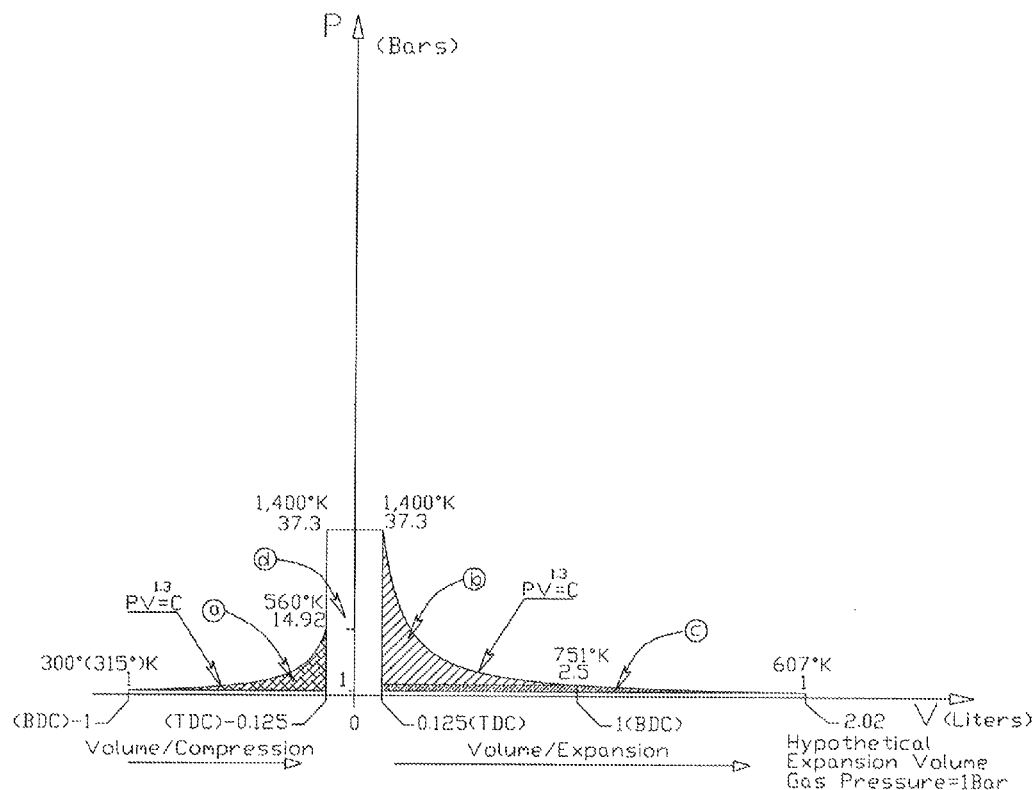
FIGURE # 12

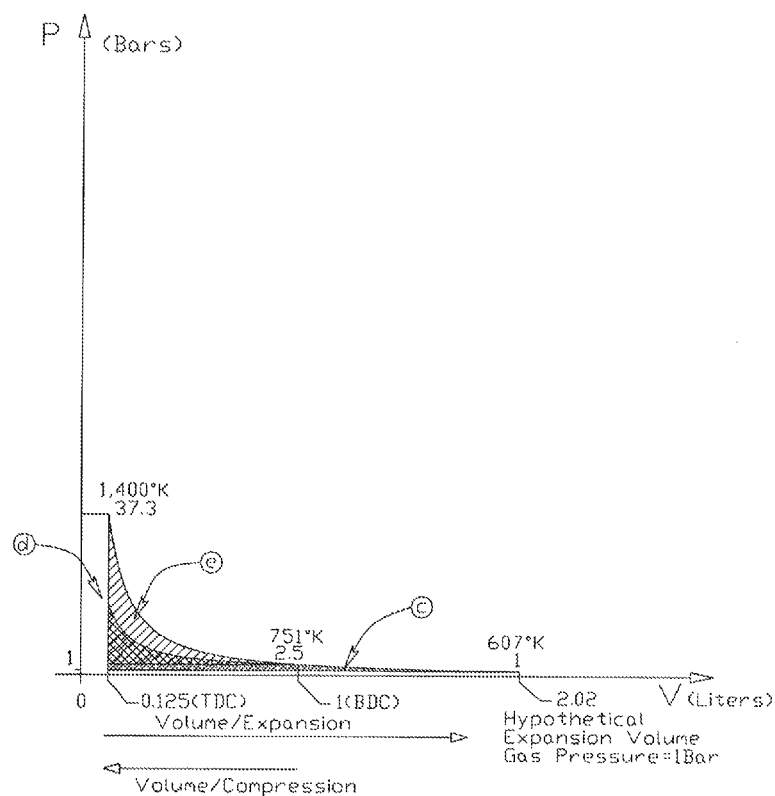
FIGURE # 12A

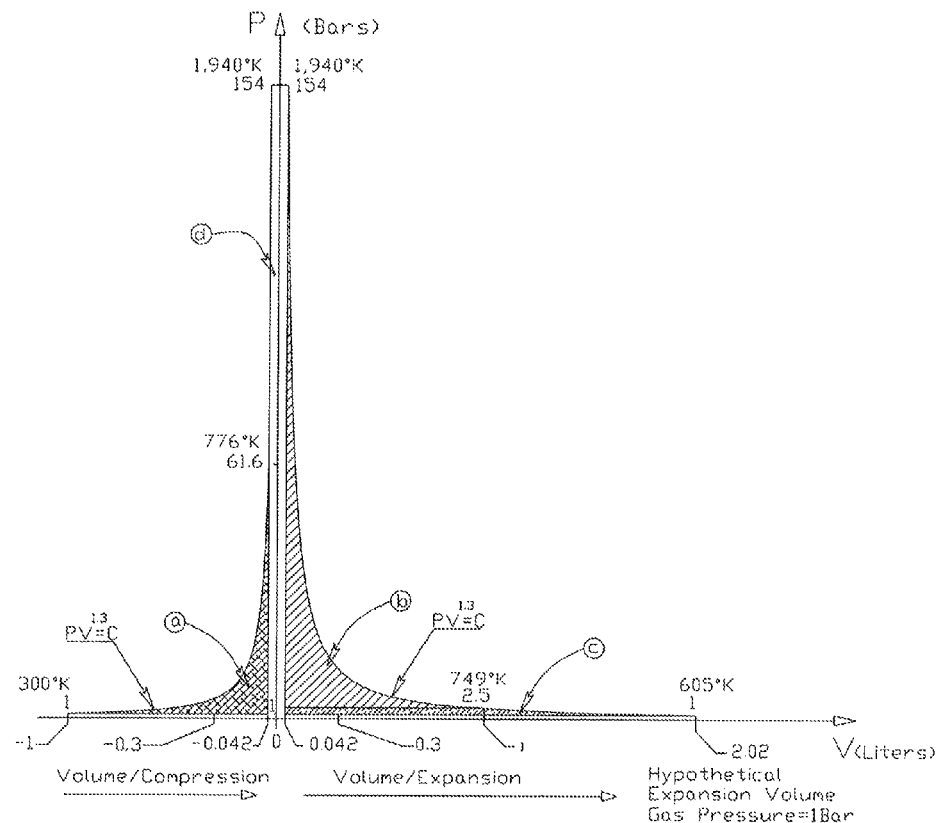
FIGURE # 13

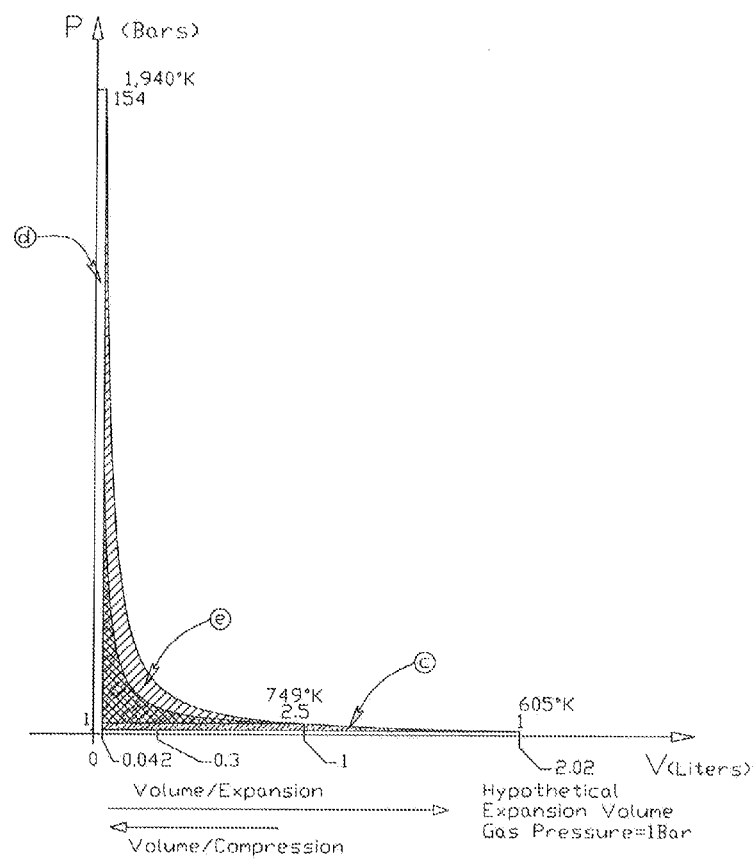
FIGURE # 13A

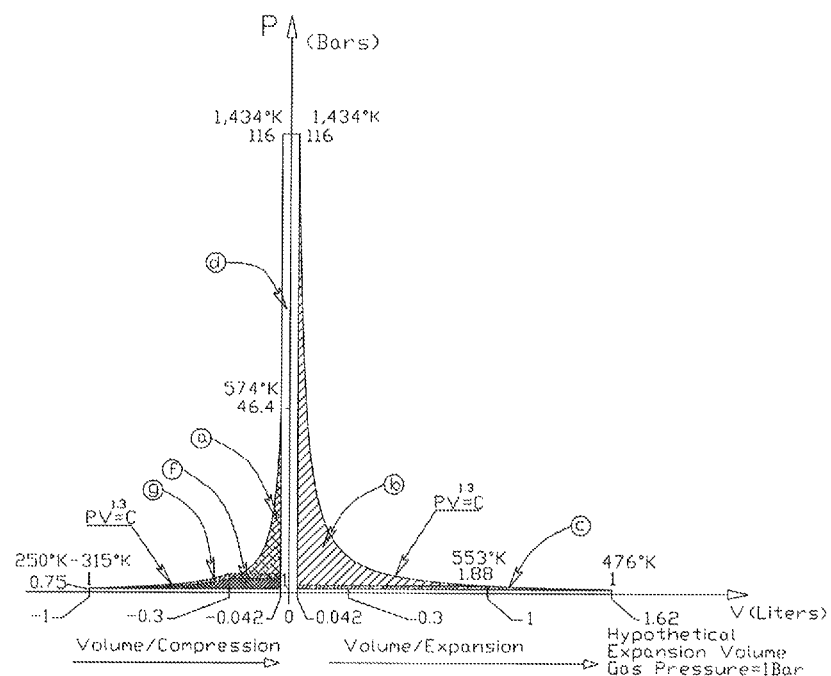
FIGURE # 14

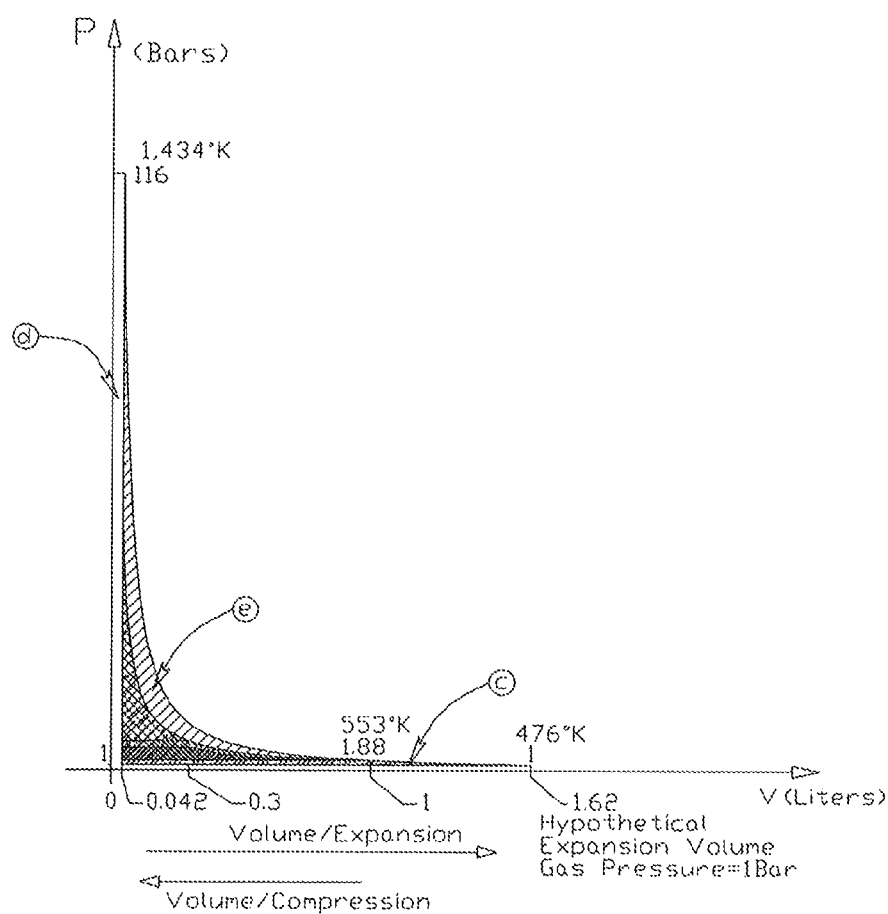
FIGURE # 14A

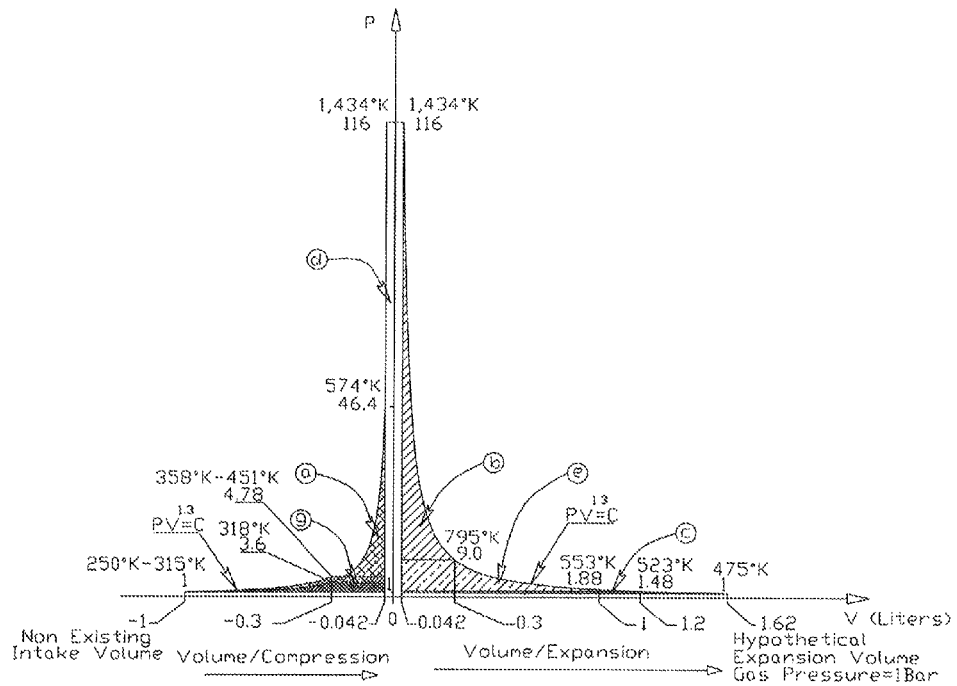
FIGURE # 15

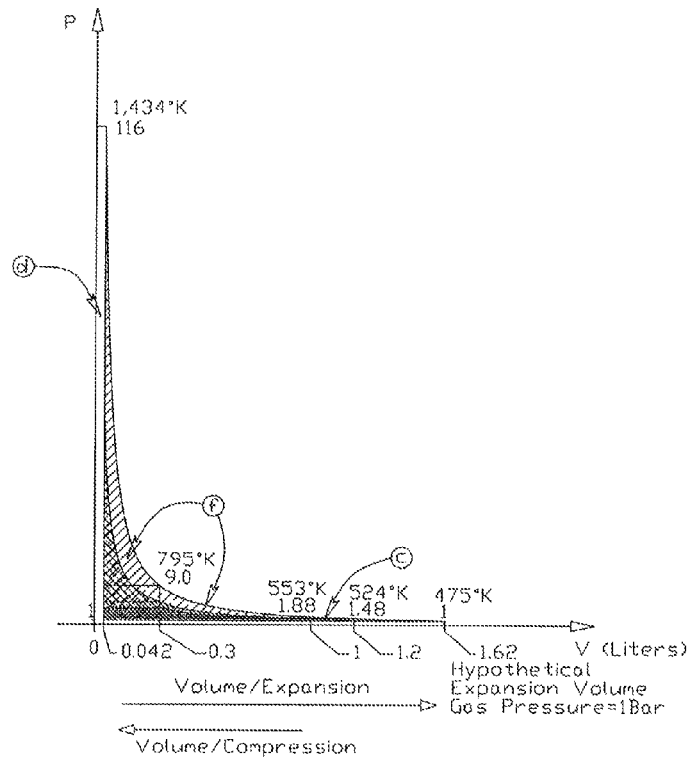
FIGURE # 15A

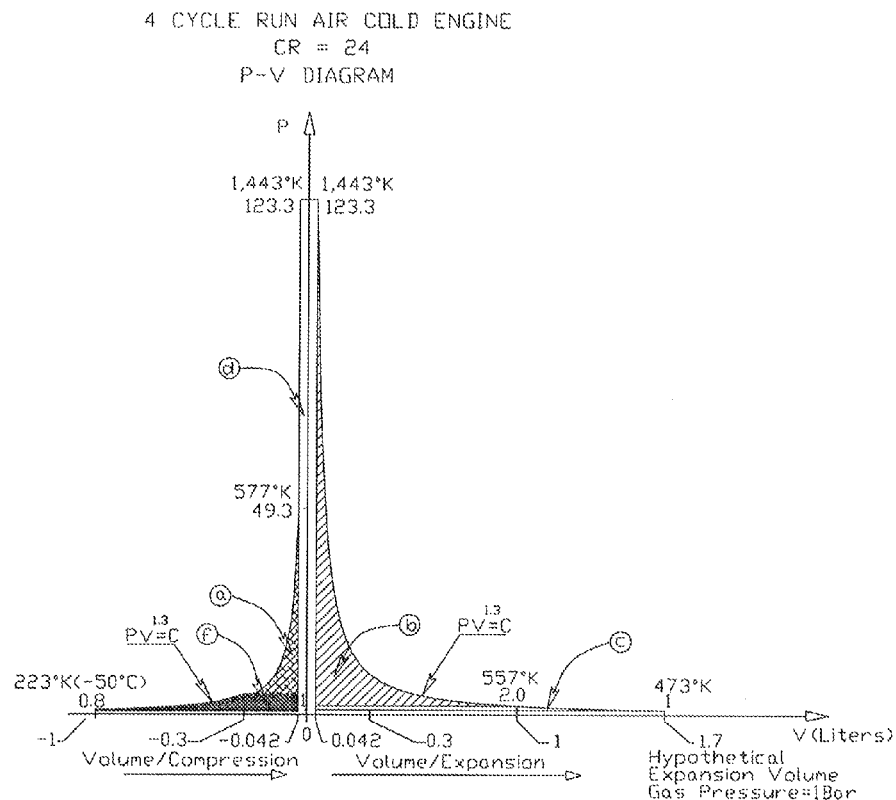
FIGURE # 16

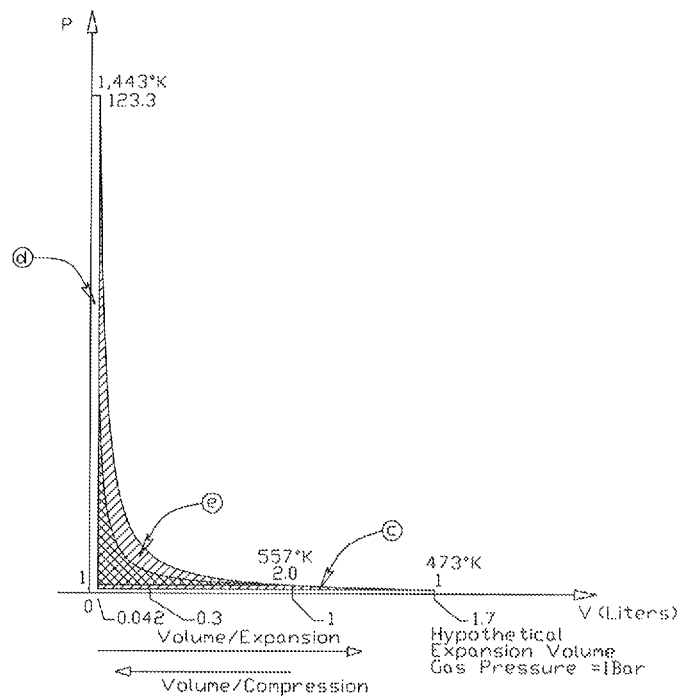
FIGURE # 16A

FOUR-CYCLE INTERNAL COMBUSTION ENGINE WITH PRE-STAGE COOLED COMPRESSION

REFERENCE TO RELATED APPLICATIONS

This application is a continuation-in-part of application Ser. No. 14/200,202, filed Mar. 7, 2014.

FIELD OF INVENTION

The present invention relates to the field of internal combustion engines, and more particularly to the field of four-cycle Spark Ignition-Internal Combustion Engines (SI-ICE).

BACKGROUND OF THE INVENTION

The efficiency of a standard four-cycle petroleum internal combustion engine is limited with respect to compression ratio and pre-ignition compression high pressure temperatures. This is because of the need to avoid pre-ignition temperatures close to the fuel's auto-ignition temperature threshold, beyond which the knocking effect will impair efficiency and reduce engine life. Since temperature of intake air in a standard four-cycle engine depends on the ambient temperature that can typically vary from −20° C. to +42° C., at full compression inside the engine cylinder, this ambient temperature range translates to a variance of about 120° C. in pre-ignition temperature. As a consequence of this pre-ignition temperature variance, standard four-cycle engines are typically limited to a low compression ratio (CR), a parameter that is the ratio of the entire engine cylinder volume divided by the combustion chamber volume. For engines using standard gasoline fuel, CR is typically not greater than 8, which limits engines pre-ignition compression pressure of not more than 15 Bars.

These temperature and pressure constraints of the standard four-cycle engine design not only reduce engine efficiency, but they also result in larger and heavier engines and impose restrictions on the type of fuel that these engines can combust without knocking.

The present invention proposes a four-cycle internal combustion engine design with a single or a multi-stage pre-cooled compression, for which we will use short term "CWPSC" engine (Combustion with Pre-Stage Compression). As will be explained herein, this design allows the temperature and pressure of intake air to the combustion cylinders to be tightly controlled, so that a much higher compression ratio and pre-ignition compression pressure can be achieved without approaching the auto-ignition threshold. Moreover, because this novel design can effectively regulate and set the maximum pre-ignition temperature of the fuel-air mixture, it can combust virtually any type of liquid hydrocarbon fuel without danger of knocking.

The four-cycle engine of the present invention, due to its much higher compression ratio, generates power equivalent to or greater than a standard four-cycle engine in a smaller and lighter engine and in an environment where all main engine parameters are under control for maximum output and efficiency.

SUMMARY OF THE INVENTION

The standard four-cycle gasoline internal combustion engine has an intake cycle, a compression cycle, an expansion cycle, and an exhaust cycle. During the intake cycle, the piston moves downward and the air-fuel mixture is drawn into the cylinder. This is followed by the compression cycle, in which the piston moves upward and compresses the air-fuel mixture to its pre-ignition compression pressure. The compression cycle culminates in spark ignition of the air/fuel mixture, which drives the piston downward in the expansion cycle. In the exhaust cycle, the piston moves upward again to drive the exhaust gas out of the cylinder in preparation for the next intake cycle.

Power is generated in the four-cycle combustion process during the expansion cycle as the ignited air-fuel mixture expands within the cylinder, causing its pressure to drop. According to the Combined Gas Law, the quantity PV/T remains constant during this expansion (where P is gas pressure in Bars, V is gas volume in Liters, and T is gas temperature in ° K). Consequently, for a given compression ratio, the pressure drop must be accompanied by a non-proportional decrease in absolute temperature. Since the decrease in absolute temperature determines the mechanical energy available for transmission to the crankshaft by the piston during the expansion cycle, the engine efficiency is optimized by maximizing the pressure drop during the expansion cycle. This, in turn, requires that the pre-ignition compression pressure be maximized by eliminating the negative effects of high temperatures.

In a standard four-cycle internal combustion engine, intake air enters the combustion cylinder at ambient temperature and atmospheric pressure (approximately 1 Bar). Engine manufacturers typically make these engines with a compression ratio (CR) of about 8 for use with regular fuel. We will consider this value of CR as an average value and will base our exemplary comparison calculations on this value. Applying the adiabatic gas process formula, $P(V)^\gamma = \text{Constant}$ (with an air compression $\gamma$ coefficient of 1.3), where the atmospheric pressure $P_a = 1$ Bar, we will consider an exemplary engine cylinder with volume $V_e = 1$ Liter. Since the CR=8, the ignition volume is ⅛ of $V_e$, so that the ignition volume is $V_i = 0.125$. Therefore:

$$P_a(V_e)^\gamma = P_i(V_i)^\gamma$$

$$P_a(V_e)^{1.3} = P_i(V_i)^{1.3}$$

$$(1)(1)^{1.3} = P_i(0.125)^{1.3}$$

$$P_i = 14.92 \text{ Bars}$$

Consequently, in the standard engine, the maximum allowable pre-ignition pressure is $P_i = 14.92$ Bars. The maximum pre-ignition gas temperature is thus a function of ambient temperature. If we consider the ambient temperature, by way of example, to be about 27° C. (300° K), and applying the Combined Gas Law, the temperature $T_i$ of the compressed air at the cylinder top dead center (TDC) can be calculated as follows:

$$P_a V_e / T_e = P_i V_i / T_i$$

$$(1)(1)/300 = (14.92)(0.125)/T_i$$

$$T_i = 560° \text{ K or } 287° \text{ C.}$$

Therefore, the compressed air/fuel mixture pre-ignition temperature needs to be kept below an auto-ignition temperature of 287° C. in this case. However, in today's standard petroleum SI-ICE engines, the manufacturers have to account for the highest potential ambient air temperatures, which is about 42° C. (315° K). In this case the maximum pre-ignition temperature is:

$$P_a V_e / T_a = P_i V_f / T_i$$

$$(1)(1)/315 = (14.92)(0.125)/T_i$$

$$T_i = 587° \text{ K or } 314° \text{ C.}$$

Consequently, all petrol fuels in use today have an auto-ignition temperature of not less than 314° C., a value which will be considered as an upper temperature limit in our calculations for the purpose of design comparisons.

In the present invention, a pre-stage compressor is used to compress the intake air, and a heat-exchanger is used to cool the compressed intake air before it enters the combustion cylinder. This is done for the purpose of significantly increasing the engine efficiency by increasing the engine compression ratio of air/fuel mixture before ignition. In order to achieve this enhanced engine efficiency, a significant heat exchange process with ambient is required. This invention reduces the temperature of the air intake so as to lower the pre-ignition temperature of the air/fuel mixture in petrol engines and keep it a constant despite ambient temperature changes. This achieves a much higher compression of the air/fuel mixture before spark ignition, comparable to the air-only compression scale in diesel engines. By lowering the temperature of intake air about 100° C., for example the pre-ignition temperature of the air/fuel mixture is lowered by about 200° C.

As the calculations below will show, for the process described above to function properly, the compressor must compress the intake air above a minimum pressure threshold of about 1.8 Bars, and the minimum temperature drop of compressed air cooled in the air cooling heat-exchanger must be more than 50° C. While results will be observable at pressures above 2.2 Bars, best results are achieved at compressed intake pressures of 3 Bars or higher. If, for example, the compressor compresses the intake air at or below the threshold of 1.8 Bars, as it does in superchargers, the required heat exchange effect will not materialize to achieve a substantial increase in engine compression ratio, since the variance in ambient temperature would be higher than the temperature drop at the heat-exchanger, and therefore the requisite compression ratio increase will not materialize. That is why superchargers do not produce significant compression ratio increases, but only produce increased engine power due to increased intake air, without increasing the efficiency of the engine.

On the other hand, one purpose of the present invention is to control the pre-ignition temperature of the air/fuel mixture so as to increase the compression ratio CR and the final pre-ignition pressure, thereby achieving higher engine efficiency. If, for example, an engine has a cylinder volume size $V_e$ and a compressor with volume $V_a$, the compressed air volume $V_c$ is equal to the engine cylinder intake volume $V_f$, which is smaller than $V_e$, and the compressor compresses the ambient air at $T_a$ 27° C. to less than a third of its ambient volume $V_a$, that is, to a volume $V_c = V_f = 0.3 V_a$, then the pre-intake air pressure $P_c$ can be calculated as follows (using the adiabatic gas process formula, with an air compression coefficient of 1.3):

$$P_a (V_a)^{1.3} = P_c (V_c)^{1.3}$$

$$(1)(1)^{1.3} = P_c (0.3)^{1.3}$$

$$P_c = 4.78 \text{ bars}$$

Applying the Combined Gas Law, the pre-intake temperature $T_c$ of this compressed air can be calculated as follows:

$$P_a V_a / T_a = P_c V_c / T_c$$

$$(1)(1)/300 = (4.78)(0.3)/T_c$$

$$T_c = 430° \text{ K} = 157° \text{ C.}$$

The heat exchanger of the present invention will then cool the compressed pre-intake air, at constant intake volume $V_t = V_c = 0.3 V_a$, to a target cylinder intake temperature $T_t$ determined by maximum ambient air temperatures, the engine's compression ratio CR, and the auto-ignition temperature of the fuel. The temperature of the hot compressed air should be cooled therefore to a constant target value of $T_t = 318°$ K or 45° C., as an example to this invention, or 3° C. hotter than 42° C., which is the assumed maximum ambient air temperature. The pressure $P_t$ of cooled intake air is then:

$$P_c V_t / T_c = P_t V_t / T_t$$

$$(4.78)(0.3)/430 = P_t(0.3)/318$$

$$P_t = 3.53 \text{ Bars.}$$

Therefore, our engine will always run on a constant 45° C. compressed air intake temperature, regardless of fluctuations in the ambient air temperature, and at an intake air pressure of 3.53 Bars, in this case, but intake air pressure will vary as ambient temperature changes. As the calculation below will show, by lowering the intake air temperature by about 100° C., the compressed air at the combustion chamber (TDC) will have a temperature of about 200° C. lower than what it otherwise would have been, thereby allowing for much higher compression ratios in these engines. This process is equivalent to splitting the engine's compression cycle into two phases, with a cooling phase in between, i.e., compress-cool-compress again, to achieve higher pre-ignition compression.

The intake pressure on these exemplary engines will vary from 3.36 Bars in the hottest weather of 42° C. to about 4.18 Bars in the coldest weather of −20° C., thereby yielding more power or better efficiency, if output power is kept constant, with efficiency gains being slightly better in colder weather than in hotter weather. The air/fuel mixture temperature in the combustion chamber just before the ignition will not change, and it will be a constant value despite the ambient temperature changes, because it is a function of the intake temperature which is continuously maintained at a constant value.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

BRIEF DESCRIPTION OF THE DRAWINGS

FIG. 1 is a schematic diagram illustrating the four-cycle combustion process of the present invention in the "Version I" four-cycle engines with one stage pre-cooled compression.

FIG. 2 is a schematic diagram illustrating the four-cycle combustion process of the present invention in the "Version I" four-cycle engine and shows in detail for this example the angle portion of crankshaft rotation for each cycle in the engine.

FIG. 3 is a schematic diagram illustrating the four-cycle combustion process of the present invention in the "Version II" four-cycle engines with one stage pre-cooled compression and energy capture process at the same compressor/expansion unit.

FIG. 4 is a schematic diagram illustrating the four-cycle combustion process of the present invention in the "Version II" four-cycle engine and shows in detail for this example the angle portion of crankshaft rotation for each cycle in the engine.

FIG. 5 is a schematic diagram illustrating the suction/compression/expansion/exhaust cycle of the engine process of the present invention in the "Version II" four cycle engine and shows in detail for this example the angle portion of crankshaft rotation for each of the above cycles in the compressor.

FIG. 6 is a schematic diagram illustrating the four-cycle combustion process of the present invention in the "Version II(A)" four-cycle engines with one stage pre-cooled compression and energy capture process at a high speed powerful turbine, which can be used to drive the pre-stage axial compressor and/or charge batteries with the help of a generator in vehicles that can have dual power drives, comprising a very small size and powerful combustion engine and a electric motor drive, wherein the system drive can switch between these two drives.

FIG. 7 is a schematic diagram illustrating the four-cycle combustion process of the present invention in the "Version II(A)" four-cycle engines with one stage pre-cooled compression and energy capture process at a powerful turbine expansion unit, in terms of the angular rotation of the crankshaft.

FIG. 8 is a schematic diagram illustrating the extended expansion process in the present invention in the "Version II" four-cycle engines and the passage that connects the engine cylinder unit with the compressor/expansion unit cylinder.

FIG. 9 is a schematic diagram illustrating in the present invention in the "Version II" four cycle engine the construction of the compressor/expansion unit to serve the dual purpose.

FIG. 10 is a schematic diagram illustrating the four-cycle combustion process of the present invention in the "Version III" four-cycle engines with one stage pre-cooled compression.

FIG. 11 is a schematic diagram illustrating the four-cycle combustion process of the present invention in the "Version III" four-cycle engine and shows in detail for this example the angle portion of crankshaft rotation for each cycle in the engine.

FIGS. 12 and 12A are exemplary P-V diagrams for a four-cycle standard single-cylinder combustion process with a compression ratio CR=8 and volume engine cylinder size $V_e$=1 Liter.

FIGS. 13 and 13A are exemplary P-V diagrams for a four-cycle hypothetical standard single-cylinder combustion process with a compression ratio CR=24.

FIGS. 14, 14A, 15, 15A, 16 and 16A are exemplary P-V diagrams for four-cycle "CWPSC" engine single-cylinder combustion processes for Versions: "Version I", "Version II", "Version II(A)" and "Version III", with respective compression ratios of CR=24, 25.2, 25.2 and 24.

DETAILED DESCRIPTIONS OF THE PREFERRED EMBODIMENTS

Referring to the above description of the engine with pre-stage compression, these engines can be developed in four illustrative embodiments "Version I", "Version II", "Version II(A)" and "Version III".

It should be understood that the single combustion cylinder design of the following exemplary embodiments can be expanded to multiple combustion cylinders, each with multiple pre-stage compressors and multiple heat exchangers.

"Version I" Engine with Pre-Stage Compression Design

In this version, shown in FIGS. 1 and 2, the engine's total effective compressor volume size will be equal to the engine cylinder volume. As an example, the compressor cylinder volume size $V_a$ is selected to be ½ Liter. Since the compressor performs 2 full cycles per 1 engine cycle in this version, $V_a*2$=1 Liter, so that the engine cylinder volume size $V_e$ will be also equal to 1 Liter as well. Let's consider that a petrol engine of 1 Liter size is required to be built with a compression ratio of CR=24 and a maximum compression temperature before ignition of 310° C. As the following calculations will show, for these required boundary parameters, the intake volume of this engine should be about $V_t$=0.3 Liters. The compressor will compress then the air in $V_t$ volume, which is smaller than $V_a*2$ volume, because the engine cylinder $V_e$ will be available on intake for a brief period during the cycle, which is only $V_t$=$V_c$=0.3 (constant) of the volume size of the engine cylinder in this example as this process proceeds. The intake process will start at about 0° of crankshaft position and it will end at about 71° of crankshaft position in the cycle, at which point the intake valves will be closed and no more air/fuel mixture can enter the engine cylinder. Since at this point the intake volume $V_t$ is only about 0.3 size of the engine cylinder volume $V_e$, the air will be compressed by the compressor, because much less intake capacity than 1 Liter volume is available at the engine. By applying the adiabatic gas process formula, where air compression coefficient is 1.3, the compressor will compress air at pressure $P_c$:

$$P_a(V_a*2)^{1.3}=P_c(V_c)^{1.3}$$

$$(1)(1)^{1.3}=P_c(0.3)^{1.3}$$

$$P_c=4.78 \text{ bars}$$

Applying the Combined Gas Law, the temperature $T_c$ of this compressed air can be calculated as follows:

$$P_a V_a 2/T_a = P_c V_c/T_c$$

$$(1)(1)/300=(4.78)(0.3)/T_c$$

$$T_c=430° \text{ K}=157° \text{ C}.$$

By applying the Combined Gas Law and cooling the compressed air to 318° K, then the intake pressure $P_t$ is calculated as follows:

$$P_c V_c/T_c = P_t V_t/T_t$$

$$(4.78)(0.3)/430=P_t(0.3)/318°$$

$$P_t=3.53 \text{ Bars}.$$

This pressurized air will then enter the engine during a short intake cycle of 0.3 the size of the engine cylinder volume $V_e$, at higher velocity than air at standard atmospheric pressure, and will atomize the fuel on intake better than standard engines. We will consider this process to be an isobaric process, since the intake volume of engine cylinder equal to 0.3 Liters is much smaller than all reservoirs plus air cooling radiator volumes, and since the compressor keeps on compressing air. The temperature of the intake air $T_t$ will be a constant 318° K(45° C.), regardless of the ambient air temperature at the time. At the end of the intake cycle, which is at about 71° position of the crankshaft, the air/fuel mixture inside the engine cylinder will have 3.53 Bars pressure in this example and a temperature of about 318° K, a constant value always.

As the cylinder moves downward toward bottom dead center (BDC), toward 180° crankshaft position, the air/fuel mixture volume will expand, thereby helping the piston to move downward but also lowering the temperature and pressure of the air/fuel mixture itself, an adiabatic process. By applying the adiabatic gas process formula, with an air compression coefficient of 1.3:

$$P_t(V_t)^{1.3} = P_e(V_e)^{1.3}$$

$$(3.53)(0.3)^{1.3} = P_e(1)^{1.3}$$

$$P_e = 0.738 \text{ Bars}$$

Where, $P_e = 0.738$ Bars is the air/fuel mixture pressure at BDC of the engine cylinder. The temperature $T_e$ of the air/fuel mixture then, by applying the Combined Gas Law, is calculated as follows at BDC:

$$P_t V_t / T_t = P_e V_e / T_e$$

$$(3.53)(0.3)/318 = (0.738)(1)/T_e$$

$$T_e = 222° \text{ K} = -51° \text{ C.}$$

This very low temperature of $T_e = 222°$ K for the air/fuel mixture at BDC enables us to have a much higher compression ratio at the combustion chamber without exceeding the auto-ignition temperatures of the air/fuel mixture. Since we have selected an engine that has a CR=24 (a much higher value than 8), then the pressure $P_i$ at the combustion chamber just before ignition at TDC, for a compressed chamber volume of $V_i = 1$ Liter/24 CR=0.042 Liters, is calculated by the adiabatic gas process formula as follows:

$$P_e(V_e)^{1.3} = P_i(V_i)^{1.3}$$

$$(0.738)(1)^{1.3} = P_i(0.042)^{1.3}$$

$$P_i = 45.48 \text{ Bars}$$

The temperature $T_i$ of the pre-combustion compressed air/fuel mixture, by applying the Combined Gas Law, is calculated as follows at TDC:

$$P_e V_e / T_e = P_i V_i / T_i$$

$$(0.738)(1)/222 = (45.48)(0.042)/T_i$$

$$T_i = 575° \text{ K} = 302° \text{ C.}$$

This engine would work then with CR=24 and a pre-ignition air/fuel mixture pressure of about 46 Bars at an ambient temperature of 27° C. The pre-ignition temperature of the compressed air mixture is thus 302° C., a constant value always, which is lower than that of a standard engine, as the above calculations show. This concept can be applied for any desired pre-ignition temperature, allowing us to build this way an engine that can burn any fuel desired, building thus a multi-fuel engine without any loss in the efficiency of the engine.

Let us compare now the efficiencies between a standard engine and the "Version I" engine with pre-stage compression. If we assume that the energy released on burning fuel mixture inside the combustion chamber is in a quantity such that it will increase the temperature and therefore the gas pressure by about 2.5 times, and assuming that the compressed volume does not change during ignition, some comparisons can be made to evaluate each of these engines in relation to each other.

1—Standard Engine Performance, CR=8:
By applying the Combined Gas Law formula after burn process:

$$P_i V_i / T_i = P_f V_f / T_f$$

$$(14.92)(0.125)/560 = (37.3)(0.125)/T_f$$

$$T_f = 1,400° \text{ K}$$

Where, $P_f$—is gas pressure after the burning process, $V_f$—is engine volume after the burning process, and $T_f$—is the gas temperature after burning. Since we consider that the burning process happens so quickly that the engine volume does not change during this process, then $V_f = V_i = 0.125$ Liters.

Let's consider now the expansion process, which is in fact the work process in this engine. By applying the adiabatic gas process formula, with an air compression coefficient of 1.3 we can calculate the exhaust gas pressure $P_x$:

$$P_f(V_f)^{1.3} = P_x(V_e)^{1.3}$$

$$(37.3)(0.125)^{1.3} = P_x(1)^{1.3}$$

$$P_x = 2.5 \text{ Bars}$$

By applying the Combined Gas Law formula just right before exhaust process, we can calculate the exhaust gas temperature $T_x$:

$$P_f V_f / T_f = P_x V_e / T_x$$

$$(37.3)(0.125)/1,400 = (2.5)(1)/T_x$$

$$T_x = 751° \text{ K}$$

Therefore, the standard engine will have an exhaust gas pressure $P_x = 2.5$ Bars and an exhaust gas temperature $T_x = 751°$ K.

2—Engine with Pre-Stage Compression "Version I" Performance, CR=24:
By applying the Combined Gas Law formula to the after burn process:

$$P_i V_i / T_i = P_f V_f T_f$$

$$(45.48)(0.042)/575 = (113.7)(0.042)/T_f$$

$$T_f = 1,437° \text{ K}$$

Where, $P_f$—is gas pressure after the burning process, $V_f$—is engine volume after the burning process, and $T_f$—is the gas temperature after burning. If we consider also that the burning process happens so quickly that the engine volume does not change during this process, then $V_f = V_i = 0.042$ Liters.

Let's consider the expansion process which is in fact the work process in this engine. By applying the adiabatic gas process formula, with an air compression coefficient of 1.3 we can calculate the exhaust gas pressure $P_x$:

$$P_f(V_f)^{1.3} = P_x(v_e)^{1.3}$$

$$(113.7)(0.042)^{1.3} = P_x(1)^{1.3}$$

$$P_x = 1.84 \text{ Bars}$$

By applying the Combined Gas Law formula just right before exhaust process, we can calculate the exhaust gas temperature $T_x$:

$$P_f V_f / T_f = P_x V_e / T_x$$

$$(113.7)(0.042)/1,437 = (1.84)(1)/T_x$$

$$T_x = 554° \text{ K}$$

Therefore, the engine with pre-stage compression CWPSC "Version I" will have an exhaust gas pressure $P_x$=1.84 Bars, which is less than that of a standard engine of 2.5 Bars, and an exhaust gas temperature $T_x$=554° K, which is about 200° less than that of a standard engine. It follows that the engine with pre-stage compression has more energy converted to work than its standard counterpart, and consequently higher efficiency in terms of the conversion of combustion heat into mechanical energy.

Referring to FIG. 1, it schematically depicts a first embodiment of an exemplary single-cylinder four-cycle internal combustion engine with pre-cooled compression 20, referred to as "Version I". The engine block 1 comprises a pre-stage compressor 2, a combustion cylinder 8, and an air-cooled heat exchanger 4. In this embodiment, the combustion cylinder 8 and the compressor 2 are connected to the same crankshaft 9 and flywheel 17. Due to the four-cycle combustion process 19, the compressor 2 will complete two compression cycles for each complete combustion cycle. Therefore, during each combustion cycle, the compressor 2 will intake and compress a volume of air equal to twice its cylinder volume.

FIG. 2 is an exemplary four-cycle, single-cylinder combustion process diagram 19, comprising a short intake 11 process (0°-71°), compression 14 (100°-360°), cold air expansion 13 (71°-180°), hot expansion 12 (360°-540°) and exhaust 15 (540°-0°) cycles, with a compression ratio CR 10 of 24:1.

The relative volumes of the compressor cylinder 2 and the combustion cylinder 8 are selected to achieve a design compressed air pressure $P_c$. In the exemplary configuration of FIG. 1, the combustion cylinder 8 is 1 Liter and the compressor cylinder 2 is 0.5 Liters. Therefore, for each engine combustion cycle, the compressor 2 will intake and compress 1 Liter of ambient air. If the ambient air is at a pressure $P_a$ and temperature $T_a$, then the gas laws may be applied to calculate a compressed air pressure $P_c$ of about 4.78 bars and temperature $T_c$ of about 157° C. By increasing the volume of the compressor cylinder 2 relative to the combustion cylinder 8, the values of $P_c$ and $T_c$ can be increased to achieve higher design values, as required.

The compressed air at pressure $P_c$ and temperature $T_c$ is stored in a pre-stage air reservoir 3, which has a regulating pressure valve 5 to maintain the pressure at the design $P_c$. The compressed air from the reservoir 3 is then released, without volume expansion, into the air-cooled heat exchanger 4. The rate of heat exchange in the heat exchanger 18 is controlled by fan speed.

These heat exchange controls can be regulated by a central processing unit (CPU, not shown), based on readings of pressure sensors 5 or the throttle 21 in front of the heat exchanger, to achieve a target combustion cylinder intake temperature $T_t$. The target intake temperature $T_t$ is selected so as to avoid engine knocking at the engine's design compression ratio CR, based on the auto-ignition temperature of the fuel. Alternately, the CPU can be programmed to control the rate of heat exchange in order to achieve a variety of combustion cylinder intake temperatures $T_t$ so as to avoid knocking at various adjustable compression ratios and/or fuel auto-ignition temperatures.

FIGS. 12 and 12A represent the P-V diagrams 42 of a standard 1 Liter engine with CR=8, where:
   a—work spent by the engine on compression=2.010 PV/cycle,
   b—work gained by engine on expansion=5.035 PV/cycle,
   c—work that cannot be captured on exhaust and is lost=1.880 PV/cycle,
   d—heat applied to the engine by burning fuel which increases the pressure by 2.5 times,
   e—work balance gained by engine=3.025 PV/cycle.
Simplified efficiency of this engine is: E=3.025/4.905=61%

While, FIGS. 13 and 13A represent the P-V diagrams 43 of a standard "Hypothetical" 1 Liter engine in which a very high compression ratio CR=24 is assumed, without regard to pre-ignition temperature, for the purpose of comparison with "CWPSC" engine, where:
   a—work spent by the engine on compression=4.33 PV/cycle,
   b—work gained by engine on expansion=10.72 PV/cycle,
   c—work that cannot be captured on exhaust and is lost=2.15 PV/cycle,
   d—heat applied to the engine by burning fuel which increases the pressure by 2.5 times,
   e—work balance gained by engine=6.39 PV/cycle, Simplified efficiency of this engine is: E=6.39/8.54=75%.

FIGS. 14 and 14A represent the P-V diagram 44 of a CWPSC "Version I" 1 Liter engine with a compression ratio CR=24, for the purpose of comparison with a standard engine or a standard "Hypothetical" engine, where:
   a—work spent by the engine on compression=1.99 PV/cycle,
   b—work gained by engine on expansion=8.18 PV/cycle,
   c—work that cannot be captured on exhaust and is lost=1.075 PV/cycle,
   d—heat applied to the engine by burning fuel which increases the pressure by 2.5 times,
   e—work balance gained by engine=4.465 PV/cycle,
   f—work spent on compressor=1.09 PV/cycle,
   g—work lost in pre-intake air cooling=0.635 PV/cycle.
Simplified efficiency of this engine is: E=4.465/5.54=81%.

"Version II" and "Version II(A)" Engine with Pre-Stage Compression Design

In Version II, shown in FIGS. 3-5, the engine's compressor volume size will be bigger than the engine cylinder volume, $V_e < V_a$. The engine volume will be small in size compared to the engine output power. Let's consider, for example, that this engine cylinder volume is $V_e$=0.3 Liters and the compressor cylinder volume is $V_a$=1.2 Liters. The compressor cylinder will serve two purposes in the engine. It will accomplish suction/compress the air in one half engine cycle (180°-540° of the crankshaft position) and serve as an expansion extension/exhaust cylinder for the other half of engine cycle (540°-720° or 0° for the extended expansion process and 720° or 0°-180° exhaust process of the crankshaft position). The bigger the size of this compressor cylinder, if the design allows it, the higher the engine efficiency. The pressure of the compressed air $P_c$ then would be regulated by utilizing a throttle device or a discharge pressure valve. The actual compression ratio CR on these engines is not the ratio of the engine cylinder size over its combustion chamber size, but rather it is calculated by this formula:

$$CR = P_t * cr$$

Where: $P_t$—is the intake air pressure at the engine cylinder, and cr—is the nominal engine compression ratio and is equal to 7.14 (cr=0.3/0.042=7.14), in this example. Then the compression ratio is:

$$CR = 3.53 * 7.14 = 25.20$$

These engines do not have their intake process curtailed as in the "Version I". The intake process on these engines proceeds normally, as it would in a standard engine, from 0°-180° of the crankshaft position, and the air/fuel mixture intake pressure is just as high, equal to $P_t$. The compression cycle proceeds normally at 180°-360° of the crankshaft position, and the expansion proceeds normally at 360°-540° of the crankshaft position. The only difference is that as the engine's hot gas exit process (its exhaust process) is about to happen from 540°-720° or 0° of the crankshaft position, at the same time the compressor cylinder will be available by opening hot gas expansion valves so as to accept into the compressor cylinder an extended expansion cycle, an extended expansion of the hot gases of the engine, which still contain a considerable energy amounting to about half the engine's total power. The exit gases part of the engine cylinder is connected to the compressor/expansion cylinder by a thermally isolated short passage, as depicted in FIG. 8, being this is an extension of the engine's expansion process. This arrangement will capture considerable energy, which capture will depend on its compressor volume $V_a$.

We will call this an engine with capture because it captures the unused energy at the compressor cylinder or in a powerful turbine. (To avoid confusion, this is not just a regular turbo device that pushes more air into the today's turbo engines, but it is a totally different device in a totally different capacity. This is a much more powerful device, since almost half the power of the engine will be passing through it.) The engine parameter calculations on this version apply the same as the first version, "Version I".

By using known formulas and since $P_t = P_e = 3.53$ Bars in this case (an isobaric process):

$$P_e(V_e)^{1.3} = P_i(V_i)^{1.3}$$

$$(3.53)(0.3)^{1.3} = P_i(0.042)^{1.3}$$

$$P_i = 45.48 \text{ Bars}$$

The temperature $T_i$ of the pre-combustion compressed air/fuel mixture, by applying the Combined Gas Law, is calculated as follows at TDC:

$$P_e V_e / T_e = P_i V_i / T_i$$

$$(3.53)(0.3)/318 = (45.48)(0.042)/T_i$$

$$T_i = 574° \text{ K} = 301° \text{ C}.$$

By applying the same assumption that we apply heat energy of fuel burning in an amount such that the final combustion pressure $P_f$ increases by 2.5 times, and the combustion volume remains constant, then:

$$P_i V_i / T_i = P_f V_f / T_f$$

$$(45.48)(0.042)/574 = (113.7)(0.042)/T_f$$

$$T_f = 1,435° \text{ K}$$

By applying the adiabatic gas process formula, with an air compression coefficient of 1.3, we can calculate the exit gas pressure $P_u$ from the engine (the hot gas is not going to exhaust yet):

$$P_f(V_f)^{1.3} = P_u(v_e)^{1.3}$$

$$(113.7)(0.042)^{1.3} = P_u(0.3)^{1.3}$$

$$P_u = 8.83 \text{ Bars}$$

By applying the Combined Gas Law formula just right before gas engine exit process, we can calculate the engine gas exit temperature $T_u$:

$$P_f V_f / T_f = P_u V_e / T_u$$

$$(113.7)(0.042)/1,435 = (8.83)(0.3)/T_u$$

$$T_u = 796° \text{ K}$$

Therefore, $P_u = 8.83$ Bars and $T_u = 796°$ K represent a considerable energy amount which needs to be captured. We will capture this at the compressor/expansion cylinder with volume $V_a$:

$$P_u(V_f)^{1.3} = P_x(V_a)^{1.3}$$

$$(8.83)(0.3)^{1.3} = P_x(1.2)^{1.3}$$

$$P_x = 1.46 \text{ Bars}$$

By applying the Combined Gas Law formula just right before exhaust process we can calculate the exhaust gas temperature $T_x$:

$$P_u V_e / T_u = P_x V_e / T_x$$

$$(8.83)(0.3)/796 = (1.46)(1.2)/T_x$$

$$T_x = 526° \text{ K}$$

FIG. 3 illustrates a second exemplary embodiment 22 "Version II" of a four-cycle internal combustion engine having a single combustion cylinder with one-stage pre-cooled compression. This engine works the same as the first embodiment 20, except that the compressor cylinder 2 is used to capture the remaining energy out of the engine cylinder 8. The compressor cylinder 2, serves a dual purpose: one to compress air, and the other to capture remaining engine energy. The compressor cylinder 2 size is bigger than engine cylinder 8. CR 10 is 25.2.

FIG. 4 illustrates the second exemplary embodiment 22 of a four-cycle internal combustion "Version II" with a cycles diagram 23, showing the compression ratio 10, intake 11, compression 14, expansion 12 and hot gas engine cylinder exit process 15.

FIG. 5 illustrates the extended expansion captured at compressor cylinder 2, comprising air suction 25, compressor air compression 27, extended hot gas expansion 26 and gas exhaust to ambient 28.

FIG. 6 illustrates the third exemplary embodiment 32 "Version IIA" of a four-cycle internal combustion engine having a single combustion cylinder with one-stage pre-cooled compression. This engine works the same as the previous embodiment 22, except that the compressor cylinder 2 may be replaced by a powerful axial compressor 29 or a combination of a compressor cylinder and an axial compressor, and the extended expansion is captured at a powerful turbine 30 which can use the captured energy outright for vehicle movement or store the energy in a battery 31 for later consumption. The turbine 30 is driven by the energy of the remaining hot gases of the engine cylinder 8, and it may or may not be connected to the engines crankshaft 9 through a gear-box.

FIG. 7 illustrates the extended expansion diagram for the engine cylinder 8. Excess energy is captured at the turbine 30. Engine air intake 11 of compressed air after axial compressor 29, engine cylinder air/mixture compression 14, engine cylinder expansion 12, and engine cylinder hot gas exit to turbine 15.

FIG. 8 illustrates engines engine cylinder 8 and compressor/extended expansion unit 34 combinations. Excess energy is captured at the compressor cylinder 2. Engine cylinder air intake valve 38, engine cylinder hot gas exit valve 35, dual purpose compressor/expansion cylinder 2, compressor/expansion cylinder hot gas extension intake valve 36, hot gas thermo-isolated passage 39 from engine cylinder 8 to the compressor/expansion cylinder 2, and compressor/expansion cylinder exhaust valve 37.

FIG. 9 illustrates the engine's compressor/extended expansion unit 33. Excess energy is captured at the compressor cylinder 2. The drawing shows inner workings of the compressor/expansion unit 2, comprising hot gas intake valve 36, gas exhaust valve 37, ambient air compressor suction valve 40, and compressor compressed air exit valve 41.

FIGS. 15 and 15A represent the P-V diagrams of a CWPSC "Version II" 0.3 Liters engine with an actual compression ratio CR=25.2, for the purpose of comparison with a standard engine or a standard "Hypothetical" engine, where:

a—work spent by the engine on compression=1.99 PV/cycle, b—work gained by engine on expansion=4.925 PV/cycle, c—work that cannot be captured on exhaust and is lost=0.655 PV/cycle, d—heat applied to the engine by burning fuel which increases the pressure by 2.5 times, e—work captured in extended expansion by the engine=3.67 PV/cycle, f—work balance gained by engine=4.88 PV/cycle, g—total work spent on compressor=1.725 PV/cycle.

Simplified efficiency of this engine is: E=4.88/5.535=88%.

"Version III" Engine with Pre-Stage Compression Engine Design

In this version, the engine's total compressor volume size will be equal to the engine cylinder volume as well as in the first version. The difference between "Version III" and "Version I" is that in the first version the intake engine volume is controlled to be less than that of the engine cylinder volume, $V_t=0.3V_e$, while in "Version III" the intake volume is the same as the engine cylinder volume, $V_t=V_e$, but the compressed air is expanded in volume in a reservoir right before the intake process, through a pressure drop that can be achieved by a narrowing passage or a pressure discharge valve in the vacuum as the intake process proceeds. This will cause the air pressure on intake to drop to about 0.7 Bars to 0.89 Bars, depending on the ambient temperature, and the intake air temperature to drop to $T_e=222°$ K or $-51°$ C., constant always, assuming that the pressurized compressed air has been cooled to 318° K after the heat exchanger. In this example the air pressure will drop to $P_e=0.74$ Bars at the nozzle and therefore its temperature will drop to $T_e=222°$ K at intake. We will call it a "CWPSC Cold Air Engine". This low temperature allows for a high CR=24 as an example for this engine. The intake process will then proceed normally as it would in a standard engine from 0°-180° of the crankshaft position. This engine has a lower efficiency than the other 2 previous versions discussed here, due to slightly more loses in the air cooling, nevertheless this engine has still a better efficiency than a standard engine. The engine parameter calculations on this version apply the same as in the first version. Using the same formulas as in "Version I" engine, exhaust pressure $P_x=1.84$ Bars and exhaust temperature $T_x=554°$ K.

An advantageous alternative design is to have the intake on "Version III" engines modified to proceed not from 0°-180° of the crankshaft position, as described above, but to have the intake start near the end of the intake cycle, which is close to 180° of the crankshaft position for this exemplary engine, in a such was as to allow for only ⅓ of the engine cylinder size volume of the compressed air to enter the engine cylinder. In this way, the engine cylinder itself serves as an expansion tank volume, rather than the expansion tank 6 depicted in FIG. 10, such that the expansion tank 6 can be eliminated.

FIG. 10 schematically depicts the fourth embodiment 20 "Version III" of an exemplary single-cylinder four-cycle internal combustion engine with air pre-cooled compression 20. This version is similar to the "Version I" embodiment 20. The engine 1 comprises of a pre-stage compressor 2, a combustion cylinder 8, and an air-cooling heat exchanger 4. In this embodiment, the combustion cylinder 8 and the compressor 2 are connected to the same crankshaft 9 and flywheel 17. Due to the four-cycle combustion process 19, the compressor 2 will complete two compression cycles for each complete combustion cycle. Therefore, during each combustion cycle, the compressor 2 will intake and compress a volume of air equal to twice its cylinder volume. The air then is cooled at the air cooling radiator heat-exchanger 4 and then is allowed to expand at the expansion volume reservoir 6, at which location the compressed air temperature and pressure are allowed to drop precipitously through an expansion hollow passage (not shown) before engine intake.

FIG. 11, is an exemplary four-cycle, single-cylinder combustion process diagram 19 for the fourth embodiment "Version III". It comprises a normal intake 11 process (180°), compression 14, expansion 12 and exhaust 15 cycles, with a compression ratio CR 10 of 24:1.

FIGS. 16 and 16A represent the P-V diagram of a CWPSC "Version III" 1 Liter engine with compression ratio CR=24, for the purpose of comparison with a standard engine or a standard "Hypothetical" engine, where:

a—work spent by the engine on compression=3.275V/cycle, b—work gained by engine on expansion=8.81 PV/cycle, c—work that cannot be captured on exhaust and is lost=1.245 PV/cycle, d—heat applied to the engine by burning fuel which increases the pressure by 2.5 times, e—work balance gained by engine=3.81 PV/cycle, f—work lost in pre-intake air compression=1.730 PV/cycle. Simplified efficiency of this engine is: E=3.81/5.055=75%.

Efficiency Comparisons between "Standard" and "CWPSC" Engines

FIGS. 12 and 12A are exemplary P-V diagram for a four-cycle standard single-cylinder combustion process 42 with a compression ratio CR=8 and volume engine cylinder size $V_e=1$ Liter. Hypothetical expansion engine volume of 2.02 Liters represents a non-existent expansion volume at which point the engine cylinder would have to expand for gas exhaust pressure to equal 1 Bar, and no more work can possibly be extracted, despite what the exhaust temperature $T_{ex}$ value at that point is. This P-V diagram represents the work obtained by 1 full engine cycle or 2 complete rotations of the crankshaft for a total engine volume size equal to 1 Liter. Calculation of a non-existent engine volume size $V_{ex}$ for the exhaust gas pressure to reach 1 Bar, or atmospheric pressure:

$$P_f(V_f)^{1.3} = P_a(V_{ex})^{1.3}$$

$$(37.3)(0.125)^{1.3} = 1(V_{ex})^{1.3}$$

$$V_{ex} = 2.02 \text{ Liters}$$

And by applying the combined Gas Law formula just right before exhaust process we can calculate the hypothetical exhaust gas temperature $T_{ex}$ for a non-existent engine volume of 2.02 Liters:

$$P_f V_f / T_f = P_a V_{ex} / T_{ex}$$

$$(37.3)(0.125)/1,400 = (1)(2.02)/T_{ex}$$

$$T_{ex} = 607° \text{ K}$$

Where, $V_{ex}$—is a hypothetical volume that engine cylinder had to expand in order to capture all the work possible where $P_a$ is the atmospheric pressure.

The simplified efficiency of this engine, which is the ratio of the work gained over the sum of total work gained and the work lost in the hypothetical expansion engine volume of 2.02 Liters, is according to this P-V diagram only 61%. This simplified formula of calculated efficiency does not take into consideration the loses occurring from friction, heat lost in the engine, and the exhaust gas heat temperature after it has reached atmospheric pressure of 1 Bar, a temperature as proven above from the hypothetical engine volume to be 607° K or 334° C., because that gas cannot perform anymore work despite the heat that it contains.

FIGS. 13 and 13A are exemplary P-V diagrams for a four-cycle hypothetical standard single-cylinder combustion process 43 with a compression ratio CR=24, which does not take into consideration the auto-ignition temperature of the fuel, assuming that it can exist, and with a volume engine cylinder size $V_e$=1 Liter. The reason of analyzing this engine is to compare the efficiencies of this assumed engine with the performance of a standard four-cycle engine and the performance of a four-cycle "CWPSC" engine. This engine in fact should have all the characteristics of a Diesel engine which compresses only the air and the auto-ignition temperature of the fuel is not a concern. The simplified efficiency of this engine is about 75%.

FIGS. 14, 14A, 15, 15A, 16 and 16A are exemplary P-V diagrams of a four-cycle "CWPSC" engine single-cylinder combustion process 43 through 46, for Versions: "Version I", "Version II", "Version II(A)" and "Version III", with a respective compression ratio CR=24, 25.2, 25.2 and 24. As it can be seen in the P-V diagrams all simplified efficiencies of these engines are much higher that the efficiency of a standard four-cycle engine with efficiency of 61% and equal ("Version III" only) or higher than that of a hypothetical four-cycle engine (which is in fact compressed air diagram in a Diesel engine) and which has a simplified efficiency of about 75%.

As illustrated by the foregoing P-V diagrams, the efficiency of the four-cycle "CWPSC" engine exceeds not only that of the standard SI-ICE engine, but it also exceeds the efficiency of Diesel engines. This is a remarkable achievement, which clearly distinguishes "CWPSC" engines from all other SI-ICE engines, which actually have much less efficiency than Diesel engines.

The key feature of the present invention is the cooling of the compressed air prior to its injection into the combustion cylinder(s). This allows the engine to be fine-tuned in terms of pre-ignition compression temperature $T_i$ and pressure $P_i$ so as to make it adaptable to various compression ratios and fuels. With the rate of cooling regulated by a CPU, the engine can be adjusted to a range of compression ratios and can accommodate a variety of fuels. This application can be extended to all other engines including Diesel engines due to higher efficiency in "CWPSC" engine.

Although the preferred embodiments of the present invention have been disclosed for illustrative purposes, those skilled in the art will appreciate that many additions, modifications and substitutions are possible, without departing from the scope and spirit of the present invention as defined by the accompanying claims.

As used hereinabove and in the following claims, the term Top Dead Center (TDC) means the piston's closest position to the cylinder head, and the term Bottom Dead Center (BDC) means the piston's farthest position from the cylinder head. Total cylinder volume means the volume of the cylinder from TDC to BDC.

What is claimed is:

1. A four-cycle spark ignition internal combustion engine, comprising:
    one or more combustion cylinders, each cylinder having a total cylinder volume, a combustion chamber volume, an intake volume, a top dead center (TDC) and a bottom dead center (BDC), and each cylinder containing an axially reciprocating piston mechanically connected to a crankshaft and a flywheel, wherein each cylinder executes a four-cycle combustion process, comprising an intake cycle, during which the piston moves axially toward the BDC of the cylinder and draws the intake volume of an air-fuel mixture into the cylinder, followed by a compression cycle, during which the piston moves axially toward the TDC of the cylinder and compresses the air-fuel mixture to a pre-ignition compression volume, a pre-ignition compression pressure, and a pre-ignition compression temperature, followed by a spark ignition of the air-fuel mixture, which drives the piston toward the BDC of the cylinder in an expansion cycle, followed by an exhaust cycle, during which the piston moves toward the TDC of the cylinder and drives an exhaust gas out of the cylinder ahead of a next intake cycle, and wherein the total cylinder volume is the volume of the cylinder above the piston when the piston is at the BDC of the cylinder, and wherein the combustion chamber volume is the volume of the cylinder above the piston when the piston is at the TDC of the cylinder, and wherein a ratio of the total cylinder volume to the combustion cylinder volume defines a compression ratio, and wherein the compression ratio is over 18;
    one or more pre-stage air compressors, each compressor having a compressor air volume, wherein each compressor compresses the compressor air volume of ambient air at an atmospheric pressure and at an ambient air temperature, to generate a pressurized pre-intake air volume having a pre-intake air temperature and a pre-intake air pressure of more than 2.1 bars;
    one or more heat-exchangers, in which the pressurized pre-intake air volume is cooled, without volume expansion, to an intake air pressure of more than 1.8 bars and to an intake air temperature, which is at least 50° C. below the pre-intake air temperature, so as to produce an intake air volume, which is mixed with a fuel that has an auto-ignition temperature, so as to constitute the intake volume of one of the cylinders;

wherein the heat exchangers are regulated so that the intake air temperature remains constant, regardless of the ambient air temperature, and so that the intake air temperature is sufficiently low that the pre-ignition compression temperature, at a designated compression ratio, remains constant at a level below the auto-ignition temperature of the fuel; and wherein the intake air volume is expanded into the combustion cylinder during an interval of the intake cycle in which the piston nears the BDC of the cylinder, such that the intake volume of each the combustion cylinders is cooled to a cold intake temperature at least 50° C. below the intake air temperature, and wherein the expansion of the intake air volume in the combustion cylinder is regulated so that the cold intake temperature is sufficiently low that the pre-ignition compression temperature at the designated compression ratio is below the auto-ignition temperature of the fuel.

2. The engine of claim 1, wherein the heat exchangers are regulated so that the intake air temperature can be adjusted to achieve any one of multiple alternative pre-ignition compression temperatures, and wherein each alternative pre-ignition compression temperature corresponds to one of multiple alternative designated compression ratios, or to one of multiple alternative fuel auto ignition temperatures, or to a combination of one of multiple alternative designated compression ratios and one of multiple alternative fuel auto-ignition temperatures.

3. The engine of either of claim 1 or 2, wherein each of the pre-stage air compressors comprise a compressor cylinder and a compressor piston, and wherein the compressor cylinder has a total cylinder volume, a TDC and a BDC, and the compressor piston is mechanically connected to the crankshaft and the flywheel, so that the motion of the compressor piston is oppositely directed to the motion of the piston of the combustion cylinder, and wherein each of the compressor cylinders executes, concurrently with the four-cycle combustion process, a four-stage compression process, comprising a first compressor intake stage, during which the compressor piston moves axially toward the BDC of the compressor cylinder and draws a first partial volume of ambient air, equal to the compressor air volume and equal to the total cylinder volume of the compressor cylinder, into the compressor cylinder, followed by a first compressor compression stage, during which the compressor piston moves axially toward the TDC of the compressor cylinder and compresses the first partial volume of ambient air into a pre-intake air reservoir, followed by a second compressor intake stage, during which the compressor piston moves axially toward the BDC of the compressor cylinder and draws a second partial volume of ambient air, equal to the compressor air volume and equal to the total cylinder volume of the compressor cylinder, into the compressor cylinder, followed by a second compressor compression stage, during which the compressor piston moves axially toward the TDC of the compressor cylinder and compresses the second partial volume of ambient air into the pre-intake air reservoir, and wherein the compressed first partial volume and the compressed second partial volume of ambient air combine in the pre-intake air reservoir to comprise the pressurized pre-intake air volume.

4. The engine of claim 3, wherein the total cylinder volume of each of the compressor cylinders is half of the total cylinder volume of each of the combustion cylinders.

5. The engine of claim 4, wherein the intake volume of each combustion cylinder is less than half of the total cylinder volume of each of the combustion cylinders, and wherein the intake cycle of each combustion cylinder terminates before the piston of the combustion cylinder reaches the BDC of the combustion cylinder.

6. The engine of claim 3, wherein the intake volume of each combustion cylinder is equal to the total cylinder volume of each of the combustion cylinders, and wherein the intake cycle of each combustion cylinder terminates when the piston of the combustion cylinder reaches the BDC of the combustion cylinder.

7. The engine of claim 6, wherein the intake air volume is expanded in an intake air reservoir, such that the intake volume of each the combustion cylinders is cooled to a cold intake temperature at least 50° C. below the intake air temperature, and wherein the expansion of the intake air volume in the intake air reservoir is regulated so that the cold intake temperature is sufficiently low that the pre-ignition compression temperature at the designated compression ratio is below the auto-ignition temperature of the fuel.

8. The engine of either of claim 1 or 2, wherein each of the pre-stage air compressors comprise a compressor cylinder and a compressor piston, and wherein the compressor cylinder has a total cylinder volume, a TDC and a BDC, and the compressor piston is mechanically connected to the crankshaft and the flywheel, so that the motion of the compressor piston is oppositely directed to the motion of the piston of the combustion cylinder, and wherein each of the compressor cylinders executes, concurrently with the four-cycle engine combustion process, a four-stage compression-exhaust process, comprising a compressor air intake stage, during which the compressor piston moves axially toward the BDC of the compressor cylinder and draws the compressor air volume of ambient air, equal to the total cylinder volume of the compressor cylinder, into the compressor cylinder, followed by a compressor air compression stage, during which the compressor piston moves axially toward the TDC of the compressor cylinder and compresses the compressor air volume of ambient air into a pre-intake air reservoir, followed by a compressor exhaust expansion stage, during which the compressor piston is driven axially toward the BDC of the compressor cylinder by expansion of the exhaust gas from the combustion cylinder into the compressor cylinder, followed by a compressor exhaust stage, during which the compressor piston moves axially toward the TDC of the compressor cylinder and drives the exhaust gas out of the compressor cylinder.

9. The engine of claim 8, wherein the total cylinder volume of each of the compressor cylinders is greater than or equal to the total cylinder volume of each of the combustion cylinders.

10. The engine of claim 9, wherein some or all of the pre-stage air compressors are axial air compressors, and wherein the exhaust gas from each of the combustion cylinders is driven, during the exhaust cycle of the combustion cylinder, into an exhaust turbine, such that expansion of the exhaust gases drives the exhaust turbine, and such that the exhaust turbines recover energy from the exhaust gas.

* * * * *